(12) United States Patent
Masuda et al.

(10) Patent No.: US 11,654,422 B2
(45) Date of Patent: *May 23, 2023

(54) STRUCTURED CATALYST FOR CATALYTIC CRACKING OR HYDRODESULFURIZATION, CATALYTIC CRACKING APPARATUS AND HYDRODESULFURIZATION APPARATUS INCLUDING THE STRUCTURED CATALYST, AND METHOD FOR PRODUCING STRUCTURED CATALYST FOR CATALYTIC CRACKING OR HYDRODESULFURIZATION

(71) Applicant: FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Hiroko Takahashi, Tokyo (JP); Yuichiro Banba, Tokyo (JP); Kaori Sekine, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,558

(22) Filed: Nov. 27, 2019

(65) Prior Publication Data

US 2020/0094229 A1 Mar. 26, 2020

Related U.S. Application Data

(63) Continuation of application No. PCT/JP2018/021091, filed on May 31, 2018.

(30) Foreign Application Priority Data

May 31, 2017 (JP) .............................. JP2017-108641

(51) Int. Cl.
*B01J 29/06* (2006.01)
*B01J 29/14* (2006.01)
(Continued)

(52) U.S. Cl.
CPC ............ *B01J 29/14* (2013.01); *B01J 29/035* (2013.01); *B01J 29/0352* (2013.01);
(Continued)

(58) Field of Classification Search
CPC .. B01J 29/035; B01J 29/0352; B01J 29/0354; B01J 29/0356; B01J 29/0358; B01J 29/064; B01J 29/068; B01J 29/072; B01J 29/076; B01J 29/085; B01J 29/10; B01J 29/12; B01J 29/14; B01J 29/16; B01J 29/185; B01J 29/20; B01J 29/22; B01J 29/24; B01J 29/26; B01J 29/42; B01J 29/44; B01J 29/46; B01J 29/48; B01J 29/405; B01J 29/605; B01J 29/61; B01J 29/62; B01J 29/63; B01J 29/64; B01J 29/655; B01J 29/66; B01J 29/67; B01J 29/68; B01J 29/69; B01J 29/7007; B01J 29/7057; B01J 29/7038; B01J 29/7088; B01J 29/7615; B01J 29/7676; B01J 29/7815; B01J 29/7876; B01J 29/7415; B01J 29/7215; B01J 29/7476; B01J 29/7276; B01J 2229/22; B01J 2229/40; B01J 2229/38; B01J 2229/126;
(Continued)

(56) References Cited

U.S. PATENT DOCUMENTS 3,898,180 A * 8/1975 Crooks .................. C10G 45/04
                                                 502/240
4,552,855 A   11/1985 Ozin et al.
(Continued)

FOREIGN PATENT DOCUMENTS

AU   2012324802 A   6/2014
CA   2256515 A1   12/1997
(Continued)

OTHER PUBLICATIONS https://sites.engineering.ucsb.edu/~jbraw/chemreacfun/ch7/slides-masswrxn-2up.pdf, College of Engineering, UC Santa Barbara accessed Apr. 26, 2021.*
English translation of International Preliminary Report on Patentability for Application No. PCT/JP2018/021091, dated Dec. 3, 2019.
English translation of Written Opinion for Application No. PCT/JP2018/021091, dated Aug. 21, 2018.
International Search Report (EN translation of ISR only) and Written Opinion for Application No. PCT/JP2018/021091, dated Aug. 21, 2018.
Fujikawa, Takashi , "Current Status and Future Prospects of Petroleum Refining Catalysts", The Nikkan Kogyo Shimbun, Ltd., vol. 65, No. 1, Jan. 1, 2017, p. 22.
(Continued)

*Primary Examiner* — Elizabeth D Wood
(74) *Attorney, Agent, or Firm* — Dorsey & Whitney LLP

(57) ABSTRACT

To provide a structured catalyst for catalytic cracking or hydrodesulfurization that suppresses decline in catalytic activity, achieves efficient catalytic cracking, and allows simple and stable obtaining of a substance to be modified. The structured catalyst for catalytic cracking or hydrodesulfurization (1) includes a support (10) of a porous structure composed of a zeolite-type compound and at least one type of metal oxide nanoparticles (20) present in the support (10), in which the support (10) has channels (11) that connect with each other, the metal oxide nanoparticles (20) are present at least in the channels (11) of the support (10), and the metal oxide nanoparticles (20) are composed of a material containing any one or two more of the oxides of Fe, Al, Zn, Zr, Cu, Co, Ni, Ce, Nb, Ti, Mo, V, Cr, Pd, and Ru.

13 Claims, 4 Drawing Sheets

(51) Int. Cl.
| | |
|---|---|
| B01J 29/08 | (2006.01) |
| B01J 29/40 | (2006.01) |
| B01J 29/46 | (2006.01) |
| B01J 29/65 | (2006.01) |
| B01J 29/68 | (2006.01) |
| B01J 29/70 | (2006.01) |
| B01J 29/72 | (2006.01) |
| B01J 35/00 | (2006.01) |
| B01J 35/02 | (2006.01) |
| B01J 35/10 | (2006.01) |
| B01J 37/00 | (2006.01) |
| B01J 37/02 | (2006.01) |
| B01J 37/10 | (2006.01) |
| C10G 11/05 | (2006.01) |
| C10G 45/12 | (2006.01) |
| B01J 29/068 | (2006.01) |
| B01J 29/035 | (2006.01) |
| B01J 29/064 | (2006.01) |
| B01J 29/076 | (2006.01) |
| B01J 29/12 | (2006.01) |
| B01J 29/20 | (2006.01) |
| B01J 29/18 | (2006.01) |
| B01J 29/22 | (2006.01) |
| B01J 29/10 | (2006.01) |
| B01J 29/072 | (2006.01) |
| B01J 29/16 | (2006.01) |
| B01J 29/42 | (2006.01) |
| B01J 29/61 | (2006.01) |
| B01J 29/44 | (2006.01) |
| B01J 29/26 | (2006.01) |
| B01J 29/24 | (2006.01) |
| B01J 29/48 | (2006.01) |
| B01J 29/60 | (2006.01) |
| B01J 29/63 | (2006.01) |
| B01J 29/66 | (2006.01) |
| B01J 29/62 | (2006.01) |
| B01J 29/64 | (2006.01) |
| B01J 29/69 | (2006.01) |
| B01J 29/67 | (2006.01) |
| B01J 29/78 | (2006.01) |
| B01J 29/74 | (2006.01) |
| B01J 29/76 | (2006.01) |

(52) U.S. Cl.
CPC ....... B01J 29/0354 (2013.01); B01J 29/0356 (2013.01); B01J 29/0358 (2013.01); B01J 29/064 (2013.01); B01J 29/068 (2013.01); B01J 29/072 (2013.01); B01J 29/076 (2013.01); B01J 29/085 (2013.01); B01J 29/10 (2013.01); B01J 29/12 (2013.01); B01J 29/16 (2013.01); B01J 29/185 (2013.01); B01J 29/20 (2013.01); B01J 29/22 (2013.01); B01J 29/24 (2013.01); B01J 29/26 (2013.01); B01J 29/405 (2013.01); B01J 29/42 (2013.01); B01J 29/44 (2013.01); B01J 29/46 (2013.01); B01J 29/48 (2013.01); B01J 29/605 (2013.01); B01J 29/61 (2013.01); B01J 29/62 (2013.01); B01J 29/63 (2013.01); B01J 29/64 (2013.01); B01J 29/655 (2013.01); B01J 29/66 (2013.01); B01J 29/67 (2013.01); B01J 29/68 (2013.01); B01J 29/69 (2013.01); B01J 29/7007 (2013.01); B01J 29/7038 (2013.01); B01J 29/7057 (2013.01); B01J 29/7084 (2013.01); B01J 29/7088 (2013.01); B01J 29/7215 (2013.01); B01J 29/7269 (2013.01); B01J 29/7276 (2013.01); B01J 29/7415 (2013.01); B01J 29/7476 (2013.01); B01J 29/7615 (2013.01); B01J 29/7676 (2013.01); B01J 29/7815 (2013.01); B01J 29/7876 (2013.01); B01J 35/006 (2013.01); B01J 35/0013 (2013.01); B01J 35/0066 (2013.01); B01J 35/026 (2013.01); B01J 35/1057 (2013.01); B01J 35/1061 (2013.01); B01J 37/0018 (2013.01); B01J 37/0211 (2013.01); B01J 37/105 (2013.01); C10G 11/05 (2013.01); C10G 45/12 (2013.01); B01J 2229/126 (2013.01); B01J 2229/20 (2013.01); B01J 2229/32 (2013.01); B01J 2229/34 (2013.01); C10G 2300/70 (2013.01)

(58) Field of Classification Search
CPC ............... B01J 2229/20; B01J 2229/32; B01J 2229/34; B01J 35/006; B01J 35/0006; B01J 35/0066; B01J 35/026; B01J 35/023; B01J 35/0073; B01J 35/0046; B01J 35/1057; B01J 37/0018; B01J 37/0072; B01J 37/0201; B01J 37/0207; B01J 37/0203; B01J 37/0205; B01J 37/10; B01J 37/105; B01J 29/0333; B01J 29/7084; B01J 29/7269; B01J 35/0013; B01J 35/1061; B01J 37/0211; C10G 2300/70; C10G 45/12; C01B 37/02
USPC ........ 502/60, 63, 64, 65, 66, 69, 71, 73, 74, 502/77, 78, 79
See application file for complete search history.

(56) References Cited

U.S. PATENT DOCUMENTS

| | | |
|---|---|---|
| 5,026,673 A | 6/1991 | Gates et al. |
| 5,236,575 A | 8/1993 | Bennett et al. |
| 5,275,720 A | 1/1994 | Ward |
| 5,849,652 A | 12/1998 | Davies et al. |
| 5,994,603 A | 11/1999 | Mohr et al. |
| 6,040,259 A | 3/2000 | Mohr et al. |
| 6,831,203 B1 | 12/2004 | Mohr et al. |
| 6,881,703 B2 | 4/2005 | Cutler et al. |
| 7,074,373 B1 | 7/2006 | Warren et al. |
| 7,592,291 B2 | 9/2009 | Rollins et al. |
| 7,893,311 B2 | 2/2011 | Takamatsu et al. |
| 11,161,101 B2 | 11/2021 | Kato et al. |
| 2003/0109383 A1 | 6/2003 | Koike et al. |
| 2003/0188991 A1 | 10/2003 | Shan et al. |
| 2004/0176245 A1 | 9/2004 | Hagemeyer et al. |
| 2004/0192947 A1 | 9/2004 | Chane-ching et al. |
| 2005/0201920 A1 | 9/2005 | Shan et al. |
| 2006/0211777 A1 | 9/2006 | Severinsky |
| 2006/0216227 A1 | 9/2006 | Idem et al. |
| 2007/0004593 A1 | 1/2007 | Ohno et al. |
| 2007/0167551 A1 | 7/2007 | Goodwin et al. |
| 2008/0045400 A1 | 2/2008 | Rollins et al. |
| 2008/0045403 A1 | 2/2008 | Rollins et al. |
| 2008/0051280 A1 | 2/2008 | Hagemeyer et al. |
| 2008/0072705 A1 | 3/2008 | Chaumonnot et al. |
| 2008/0280754 A1 | 11/2008 | Toledo et al. |
| 2008/0293990 A1 | 11/2008 | Stevenson et al. |
| 2009/0286677 A1 | 11/2009 | Takeshima et al. |
| 2009/0325790 A1 | 12/2009 | Haller et al. |
| 2010/0004118 A1 | 1/2010 | Liu et al. |
| 2011/0085944 A1 | 4/2011 | Rollins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0042631 A1 | 2/2012 | Schmieg et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |

(56) References Cited

U.S. PATENT DOCUMENTS

| | | |
|---|---|---|
| 2012/0231948 A1 | 9/2012 | Saito |
| 2013/0041174 A1 | 2/2013 | Yamamoto et al. |
| 2013/0090445 A1 | 4/2013 | Hattori et al. |
| 2014/0021096 A1 | 1/2014 | Chaumonnot et al. |
| 2014/0128246 A1 | 5/2014 | Garcia-martinez |
| 2014/0147362 A1 | 5/2014 | Sasaki et al. |
| 2014/0284524 A1 | 9/2014 | Lee et al. |
| 2014/0303266 A1 | 10/2014 | Hyman |
| 2015/0018590 A1 | 1/2015 | Stevenson et al. |
| 2015/0290635 A1 | 10/2015 | Inokawa et al. |
| 2015/0367332 A1 | 12/2015 | Kuvettu et al. |
| 2016/0017238 A1 | 1/2016 | Stamires et al. |
| 2016/0023913 A1 | 1/2016 | Goel et al. |
| 2016/0024400 A1 | 1/2016 | Iwasa et al. |
| 2016/0030934 A1 | 2/2016 | Zhan et al. |
| 2016/0032202 A1 | 2/2016 | Yonemura et al. |
| 2016/0087285 A1 | 3/2016 | Watanabe et al. |
| 2016/0114314 A1 | 4/2016 | Ali et al. |
| 2016/0137516 A1 | 5/2016 | Kegnæs et al. |
| 2016/0369174 A1 | 12/2016 | Kool et al. |
| 2017/0036197 A1 | 2/2017 | Kegnæs et al. |
| 2018/0194700 A1 | 7/2018 | Pan et al. |
| 2019/0039056 A1 | 2/2019 | Kato et al. |
| 2020/0094232 A1 | 3/2020 | Masuda et al. |
| 2020/0108374 A1 | 4/2020 | Masuda et al. |
| 2020/0108378 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0114341 A1 | 4/2020 | Masuda et al. |
| 2020/0115248 A1 | 4/2020 | Masuda et al. |
| 2020/0115640 A1 | 4/2020 | Masuda et al. |
| 2020/0254432 A1 | 8/2020 | Shirman et al. |

FOREIGN PATENT DOCUMENTS

| | | |
|---|---|---|
| CN | 1223602 A | 7/1999 |
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102400744 A | 4/2012 |
| CN | 102574120 A | 7/2012 |
| CN | 102844115 A | 12/2012 |
| CN | 103459012 A | 12/2013 |
| CN | 103663490 A | 3/2014 |
| CN | 103889577 A1 | 6/2014 |
| CN | 104650291 A | 5/2015 |
| CN | 105008492 A | 10/2015 |
| CN | 105347359 A | 2/2016 |
| CN | 106362787 A | 2/2017 |
| EP | 0485180 A1 | 5/1992 |
| EP | 1709125 A1 | 10/2006 |
| EP | 2484444 A1 | 8/2012 |
| EP | 2692439 A1 | 2/2014 |
| EP | 2992984 A1 | 3/2016 |
| JP | S5746925 A | 3/1982 |
| JP | H0549943 A | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 2011517439 A | 6/2011 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017509732 A | 4/2017 |
| JP | 2017128480 A | 7/2017 |
| WO | 9745197 A1 | 12/1997 |
| WO | 9745387 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A1 | 1/2015 |
| WO | 2015155216 A1 | 10/2015 |
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS

Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.

Haruta, Masatake, "Low-Temperature Combustion Catalysts Mainly for Co Oxidation", Journal of The Japan Petroleum Institute, vol. 37, No. 5, Sep. 1, 1994, pp. 480-491.

Ichikawa, Masaru et al., "Advanced Technology of Methane Chemical Conversion", CMC Publishing Co., Ltd., Jan. 2008.

Ismagilov, Z.R. et al. "Structural Changes of MO/ZSM-5 Catalysts During the Ethane Dehydroaromatization", Eurasian Chemico-Technological Journal, Journal 12, Nov. 2009, 9-16.

Laprune, David et al., "Highly Dispersed Nickel Particles Encapsulated in Multi-Hollow Silicalite-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.

(56) References Cited

OTHER PUBLICATIONS

Muroi, Takajyo, "Development Trends of Methane Chemistry Catalysts", Catalyst Round-table Conference News, No. 96, Nov. 1, 2016.
Muroi, Takashiro, "Reverse Water Gas Shift Catalysts", Industrial Catalyst News, No. 107, Aug. 1, 2017, 2 pages.
Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.
Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.
English machine translation of CN 106362787 A, entitled "Preparation method for zeolite-immobilized photocatalyst" dated Feb. 1, 2017.
English machine translation of JP 2002255537 A entitled "Solid Acid Catalyst" dated Sep. 11, 2002.
English machine translation of JP 2005314208 A entitled "Combined Porous Body and Its Manufacturing Method and Organic Substance Converting Method Using the Same" dated Nov. 10, 2005.
English machine translation of JP 2012170951 A entitled "Photocatalyst-Adsorbent Composite Powder" dated Sep. 10, 2012.
English machine translation of JP 2015165138 A entitled "Exhaust Gas Emission Control Device" dated Sep. 17, 2015.
English machine translation of JP 2016069318 A entitled "Storing Method for Secondary Alcohol and Loaded Body" dated May 9, 2016.
English machine translation of JP 2017128480 A entitled "Zeolite Including Metal Particle" dated Jul. 27, 2017.
English machine translation of JP H0549943A entitled "Oxidizing Catalyst" dated Mar. 2, 1993.
English machine translation of JPH1133412 entitled "A Production of Metal-Supporting Catalyst" dated Feb. 9, 1999.
English machine translation of WO 2007/023558 A1 entitled "Tungsten Oxide Photocatalyst, Process for Producing the Same, and Fiber Cloth Having Deodorizing/Antifouling Function" dated Mar. 1, 2007.
English machine translation of WO 2009/096548 A1 entitled "Silver-(Titanium Oxide)-Zeolite Adsorbent/Decomposing Material and Process for Production Thereof" dated Aug. 6, 2009.
English machine translation of WO 2012/105581 A1 entitled "Method for Producing Oxide Semiconductor Layer" dated Sep. 8, 2012.
Extended European Search Report for EP Application No. 18810103.4, dated Nov. 13, 2020.
Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.
Liu, Xue et al., "Drying of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.
Makshina, Ekaterina et al., "Methanol Oxidation on LaCo Mixed Oxide Supported Onto MCM-41 Molecular Sieve", Catalysis Today, vol. 131, No. 1, Nov. 2007, pp. 427-430.
Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.
Wang, Hong et al., "Research into eliminating particulate from diesel engine exhaust over zeolite covered with catalysts of perovskite-type oxides", 2009 International Conference on Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.
Yokoi, Toshiyuki , "Characterization of Zeolites by Advanced SEM/STEM Techniques", The Hitachi Scientific Instrument News, vol. 7, Sep. 2016, pp. 17-23.
Yue, Ming B. et al., "Directly Transforming As-Synthesized MCM-41 to Mesoporous MFI Zeolite", Journal of Material Chemistry, vol. 18, No. 17, Mar. 13, 2008, p. 2044.
Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN: 0021-9517, DOI: 10.1016/J.JCAT.2013.12.021.
English Translation of CN 102247887(A).
Wang, D Y. et al., Study on methane aromatization over MoO3/HMCM-49 catalyst, 2004, Catalysis Today, 93-95, Jul. 2, 2004, 75-80.
Do, Trong-On , et al., "Zeolite Nanoclusters Coated onto the Mesopore Walls of SBA-15", J. Am. Chem. SOC. vol. 126, No. 44, 2004, pp. 14324-14325.
Newsam, J.M., "The Zeolite Cage Structure", Science, Mar. 7, 1986, New Series, vol. 231, No. 2742, pp. 1093-1099 (Year: 1986).
Wen , et al., "Enhanced catalytic performance of Co/MFI by hydrothermal treatment", Catalysis Letters vol. 86, Nos. 1-3, Mar. 2003.
[English Translation] Notice of Reasons for Refusal dated Feb. 7, 2022 for Japanese Patent Application No. 2019-521334.
[English Translation] Notice of Reasons for Refusal dated Feb. 7, 2022 for Japanese Patent Application No. 2019-521335.
[English Translation] Notice of Reasons for Refusal dated Feb. 7, 2022 for Japanese Patent Application No. JP2019-521325.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
Hosseinpour, Negahdar , et al., "Cumene cracking activity and enhanced regeneration of FCC catalystscomprising HY-zeolite and LaBO3(B = Co, Mn, and Fe) perovskites". Applied Catalysis A, vol. 487,, Oct. 2014, pp. 26-35.
Laprune, David , et al., "Highly Disperesed Nickel Particles Encapsulated in Multihollow Silicalite-1 Single Crystal Nanoboxes: Effects of Siliceous Deposits and Phosphorous Species on the Catalytic Performances", ChemCatChem, Sep. 2017, pp. 2297-2307.
Liang, Wenping , et al., "Surfactant Applications in Dispersion Systems", China Light Industry Press, Feb. 2003.
Roque-Malherbe, Rolando M.A., "Adsorption and Diffusion in Nanoporous Materials", Materials Chemistry, Mar. 5, 2007.
English machine translation of JP 2000-511107 A, entitled "Metal-containing zeolite catalyst, its preparation and use for the conversion of hydrocarbons".
English machine translation of JPH0796195 A, entitled "Exhaust Gas Purification Catalyst" dated Sep. 29, 1993.
Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2017), pp. 335-343, XP085215768, ISSN: 0920-5861, DOI: 10.1016/J.CATTOD.2017.02.001.
Li, Shiwen et al., "Diffusion Driven Selectivity in Oxidation of Co in Presence of Propylene Using Zeolite Nano Shell as Membrane.", ACS Catalysis, vol. 4, No. 12, Dec. 2014, pp. 4299-4303.
Li, Shiwen et al., "Diffusion-Driven Selectivity in Oxidation of Co in the Presence of Propylene Using Zeolite Nano Shell as Membrane", ACS Catalysis, vol. 4, No. 12, Nov. 2014.
[English Translation] First Office Action dated Aug. 3, 2022 for Chinese Patent Application No. 201880035569.8; pp. all.
[English Translation] First Office Action dated Aug. 3, 2022 for Chinese Patent Application No. 201880036313.9; pp. all.
[English Translation] Notice of Reasons for Refusal dated Aug. 16, 2022 for Japanese Patent Application No. 2019-521324; pp. all.
[English Translation] "Preparation and Application of Molecular Sieves", Edited by Shanghai Reagent Factory, Jun. 1976; pp. all.

(56) References Cited

OTHER PUBLICATIONS

Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants on High-Silica Zeolites Causing S-Shaped Adsorption Isotherms: An Experimental and Monte Carlo Simulations Study", Chemical Engineering Journal; Nov. 2019; pp. all.
[English Translation] Notice of Reasons for Refusal dated Jun. 28, 2022 for Japanese Patent Application No. 2019-521318; pp. all.
[English Translation] Notice of Reasons for Refusal dated Jun. 28, 2022 for Japanese Patent Application No. 2019-521319; pp. all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] First Office Action dated Apr. 20, 2022 for Chinese Patent Application No. 201880035803.7; pp. all.
[English Translation] Li, Jinlin , et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng , et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] The First Office Action dated Jul. 20, 2022 for Chinese Patent Application No. 201880035173.3.
[English Translation] The First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Miao, Tao , et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
Cho, Hong J. et al., "Zeolite-Encapsualted Pt Nanoparticlles for Tandem Catalysis", J. Am. Chem. Soc., Sep. 24, 2018, 13514-13520.
Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.
Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.
[English Translation] Notice of Reasons for Refusal dated Mar. 16, 2022 for Japanese Patent Application No. 2019-521322.
[English Translation] Notice of Reasons for Refusal dated Mar. 28, 2022 for Japanese Patent Application No. 2019-521324.
[English Translation] Notice of Reasons for Refusal for Japanese Patent Application No. 2019-521326 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke , "Catalysis i Fine chemical process", Sinopec Press; ISBN 7-80164-251-1, Aug. 2002, 4 pages.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action dated May 6, 2022 for Australian Patent Application No. 2021202968; pp. all.
Dai, Chengyi, et al., "Hollow Zeolite encapsulated Ni—Pt bimetals for sintering and coking resistant dry reforming of methane", Journal of Materials Chemistry A, Jan. 1, 2015, 9 pages.
[Partial English Translation] Zhang, Yicheng , et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong, et al., "Preparation of Phenol and Acetone with Solid Acid Catalyst", [With Chemical World, Mar. 16, 2012, pp. 487-490.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334, pp. all.
[English Translation] Notice of Reasons for Refusal dated Sep. 27, 2022 for Japanese Patent Application No. 2019-521335, pp. all.
[English Translation] Notice of Reasons for Refusal dated Mar. 16, 2022 for Japanese Patent Application No. 2019-521331.
[English Translation] Second Office Action dated Dec. 23, 2022 in CN Application No. 201880035210.0; pp. all.
[English Translation] Second Office Action dated Jan. 5, 2023 in CN Application No. 201880035525.5; pp. all.
Office Action dated Dec. 18, 2022 for SA Application No. 519410677; pp. all.
Office Action dated Dec. 18, 2023 for SA Application No. 519410673; pp. all.
Office Action dated Dec. 26, 2022 for SA Application No. 519410680; pp. all.
Second Office Action dated Jan. 20, 2023 for CN Application No. 201880035360.1; pp. all.
Second Office Action dated Jan. 12, 2023 for CN Application No. 201880036382.X; pp. all.
Second Office Action dated Jan. 19, 2023 for CN Application No. 201880035017.7; pp. all.
Second Office Action dated Jan. 20, 2023 for CN Application No. 201880035026.6, pp. all.
Second Office Action dated Jan. 18, 2023 in CN Application No. 201880036313.9; pp. all.
Decision of Refusal for Japanese Patent Application No. 2019-521318, dated Feb. 1, 2023, pp. all.
Decision of Refusal for Japanese Patent Application No. 2019-521319, dated Feb. 1, 2023, pp. all.
Notice of Reasons for Refusal for Japanese Patent Application No. 2019-521320, dated Feb. 1, 2023, pp, all.
Notice of Reasons for Refusal for Japanese Patent Application No. 2019-521321, dated Feb. 1, 2023, pp. all.
[English Translation] Second Office Action dated Feb. 18, 2023 in CN Application No. 201880035173.3; pp. all.

(56) References Cited

OTHER PUBLICATIONS

[English Translation] Second Office Action dated Feb. 24, 2023 in CN Application No. 201880035569.8; pp. all.
[English Translation] Notice of Reasons for Refusal dated Mar. 22, 2023 in JP Application No. 2019-521324; pp. all.
[English Translation] Third Office Action dated Mar. 8, 2023 for CN Application No. 201880035803.7; pp. all.
[English Translation] Third Office Action dated Mar. 8, 2023 in CN Application No. 201880036312.4; pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. 2019-521331 dated Apr. 4, 2023, pp. all.
[English Translation] Notice of Reasons for Refusal for Japanese Patent Application No. JP-2019-521335 dated Apr. 4, 2023, pp. all.

\* cited by examiner

STRUCTURED CATALYST FOR CATALYTIC CRACKING OR HYDRODESULFURIZATION, CATALYTIC CRACKING APPARATUS AND HYDRODESULFURIZATION APPARATUS INCLUDING THE STRUCTURED CATALYST, AND METHOD FOR PRODUCING STRUCTURED CATALYST FOR CATALYTIC CRACKING OR HYDRODESULFURIZATION

CROSS REFERENCE TO RELATED APPLICATIONS

The present application is a continuation application of International Patent Application No. PCT/JP2018/021091 filed on May 31, 2018, which claims priority to Japanese Patent Application No. 2017-108641, filed on May 31, 2017. The contents of these applications are incorporated herein by reference in their entirety.

TECHNICAL FIELD

The present disclosure relates to a structured catalyst for catalytic cracking or hydrodesulfurization, and particularly relates to a structured catalyst for catalytic cracking or hydrodesulfurization used for modification of crude oils, heavy oils, and the like, a catalytic cracking apparatus and a hydrodesulfurization apparatus including the structured catalyst, and a method for producing a structured catalyst for catalytic cracking or hydrodesulfurization.

BACKGROUND ART

Petrochemical raw materials called naphtha and various fuels such as heavy oil, light oil, kerosene, gasoline, and LP gas are produced from crude oil in petroleum complexes in oil manufacturers. Since the crude oil is a mixture in which various impurities are mixed in addition to the petrochemical raw materials described above and the various fuels, a step of distilling and separating the components contained in the crude oil is required.

Therefore, in the petroleum refining process, the difference in boiling point of each component is used, and crude oil is heated at a shelf stage in a column in an atmospheric pressure distillation apparatus to separate the crude oil for each component, and then the separated substances are concentrated. As a result, a low-boiling point substance such as LP gas or naphtha is removed at the upper shelf stage of the atmospheric pressure distillation apparatus while a high-boiling point substance such as heavy oil is removed from the bottom of the atmospheric pressure distillation apparatus. Then, the separated and concentrated substances are subjected to secondary processing such as desulfurization to produce various fuel products.

Fluid catalytic cracking (FCC), which is one of the above secondary processing, is a step of decomposing high-boiling-point hydrocarbons such as vacuum light oils and atmospheric residual oils with a solid acid catalyst at a reaction temperature of approximately from 500 to 550° C. to produce high octane gasoline. As an example of catalytic decomposition of atmospheric residual oil using a catalyst, Eri Fumoto and other three, Catalytic Cracking of Heavy Oil by Iron Oxide-Based Catalyst Using Steam-Derived Hydrogen Species and Oxygen Species", Vol. 58 (2015), No. 5, Journal of the Japan Petroleum institute, p. 329-335, [searched on May 17, 2011], Internet <URL: https://www.jstage.jst.go.jp/article/jpi/5/58_329/_pdf> proposes a method for producing a light oil and carbon dioxide from a heavy oil by catalytic decomposition in a steam atmosphere using an iron oxide-based catalyst containing zirconia and alumina. In this method, it has been reported that the alkene/alkane ratio in a light oil decreased by the increase of the proportion of water vapor to the raw material or the increase of the zirconia content in the catalyst.

SUMMARY OF DISCLOSURE

Technical Problem

Currently, in Japan, crude oil that can be managed in Japanese refineries are procured and processed. However, as the crude oil becomes heavier, processing of heavy oils will be unavoidable in the future. As a result, importance of cracking and hydrodesulfurization of heavy oils has been increasing due to the need for reduction of the sulfur content in heavy oils and the decomposition of heavy oils to naphtha and light oils. In the past, studies have been conducted on the catalytic cracking reaction of heavy oils based on experimentation, but sufficient knowledge for achieving efficient catalytic cracking and hydrodesulfurization treatment of heavy oils has not been obtained. For example, in the technology of Eri Fumoto and other three, Catalytic Cracking of Heavy Oil by Iron Oxide-Based Catalyst Using Steam-Derived Hydrogen Species and Oxygen Species", Vol. 58 (2015), No. 5, Journal of the Japan Petroleum Institute, p. 329-335, [searched on May 17, 2011], Internet <URL: https://www.jstage.jst.go.jp/article/jpi/5/58_329/_pdf>, since a complex oxide catalyst containing zirconia, alumina, and iron oxide is used, there is a problem that aggregation (sintering) between catalyst particles easily occurs due to the effects of forces, heat, or the like received from a fluid such as a substance to be modified during the catalytic cracking process, which leads to reduction of catalytic activity.

In addition, in a prior art catalytic cracking reaction of a heavy oil using an iron oxide-based catalyst, a heavy oil is decomposed by a cleavage reaction of oxygen in iron oxide, but the heavy oil after decomposition is unstable because radicals are generated in the cleaved portion of the heavy oil, so there is a need to dissipate the radicals in the cleaved portion by supplying a $H_2$ gas to stabilize the heavy oil after decomposition, which results in the necessity of cumbersome work.

An object of the present disclosure is to provide: a structured catalyst for catalytic cracking or hydrodesulfurization that suppresses a decline in catalytic activity and allows efficient catalytic cracking or hydrodesulfurization; a structured catalyst for catalytic cracking or hydrodesulfurization that allows simple and stable obtaining of a substance to be modified; a catalytic cracking apparatus and a hydrodesulfurization apparatus including the structured catalyst; and a method for producing a structured catalyst for catalytic cracking or hydrodesulfurization.

Solution to Problem

As a result of diligent research to achieve the object described above, the present inventors have found that the structured catalyst for catalytic cracking or hydrodesulfurization that can suppress the decline in catalytic activity of the catalytic substance and a structured catalyst that can realize a long life time can be obtained by including:

a support of a porous structure composed of a zeolite-type compound; and at least one type of metal oxide nanoparticles present in the support, the support having channels connecting with each other, the metal oxide nanoparticles being present at least in the channels of the support, and the metal oxide nanoparticles being composed of a material containing any one or two or more of the oxides of Fe, Al, Zn, Zr, Cu, Co, Ni, Ce, Nb, Ti, Mo, V, Cr, Pd, and Ru; thus completed the present disclosure based on such finding.

In other words, the summary configurations of the present disclosure are as follows.

[1] A structured catalyst for catalytic cracking or hydrodesulfurization including:

a support of a porous structure composed of a zeolite-type compound; and at least one type of metal oxide nanoparticles present in the support, the support having channels connecting with each other, the metal oxide nanoparticles being present at least in the channels of the support, and the metal oxide nanoparticles being composed of a material containing any one or two or more of the oxides of Fe, Al, Zn, Zr, Cu, Co, Ni, Ce, Nb, Ti, Mo, V, Cr, Pd, and Ru.

[2] The structured catalyst for catalytic cracking or hydrodesulfurization according to [1], in which the metal oxide nanoparticles are complex metal oxide nanoparticles composed of a material containing two or more of metal oxides, and the complex metal oxide nanoparticles include a first metal oxide including any one or two or more of the oxides of Fe, Al, Zn, Cu, Co, Ni, Nb, Mo, V, Cr, and Pd, and a second metal oxide including any one or two or more of the oxides of Zr, Ce, Ti, and Ru.

[3] The structured catalyst for catalytic cracking or hydrodesulfurization according to [1], in which the channels have any one of a one-dimensional pore, a two-dimensional pore, and a three-dimensional pore defined by a framework of the zeolite-type compound and an enlarged pore portion that is different from any of the one-dimensional pore, the two-dimensional pore, and the three-dimensional pore, and the metal oxide nanoparticles are present at least in the enlarged pore portion.

[4] The structured catalyst for catalytic cracking or hydrodesulfurization according to [3], in which the enlarged pore portion connects a plurality of pores constituting any one of the one-dimensional pore, a two-dimensional pore, and a three-dimensional pore to each other.

[5] The structured catalyst for catalytic cracking or hydrodesulfurization according to [3], in which the average particle size of the metal oxide nanoparticles is greater than an average inner diameter of the channels and is less than or equal to an inner diameter of the enlarged pore portion.

[6] The structured catalyst for catalytic cracking or hydrodesulfurization according to [1], in which a metal element (M) of the metal oxide nanoparticles is contained in an amount of 0.5 mass % to 2.5 mass % based on the structured catalyst.

[7] The structured catalyst for catalytic cracking or hydrodesulfurization according to [1], in which the average particle size of the metal oxide nanoparticles is from 0.1 nm to 50 nm.

[8] The structured catalyst for catalytic cracking or hydrodesulfurization according to [7], in which the average particle size of the metal oxide nanoparticles is from 0.5 nm to 14.0 nm.

[9] The structured catalyst for catalytic cracking or hydrodesulfurization according to [1], in which the ratio of the average particle size of the metal oxide nanoparticles to the average inner diameter of the channels is from 0.06 to 500.

[10] The structured catalyst for catalytic cracking or hydrodesulfurization according to [9], in which the ratio of the average particle size of the metal oxide nanoparticles to the average inner diameter of the channels is from 0.1 to 36.

[11] The structured catalyst for catalytic cracking or hydrodesulfurization according to [10], in which the ratio of the average particle size of the metal oxide nanoparticles to the average inner diameter of the channels is from 1.7 to 4.5.

[12] The structured catalyst for catalytic cracking or hydrodesulfurization according to [3], in which the average inner diameter of the channels is from 0.1 nm to 1.5 nm, and the inner diameter of the enlarged pore portion is from 0.5 nm to 50 nm.

[13] The structured catalyst for catalytic cracking or hydrodesulfurization according to [1], further including at least one other type of metal oxide nanoparticles held on an outer surface of the support.

[14] The structured catalyst for catalytic cracking or hydrodesulfurization according to [13], in which the content of the at least one type of metal oxide nanoparticles present in the support is greater than the content of the at least one other type of metal oxide nanoparticles held on the outer surface of the support.

[15] The structured catalyst for catalytic cracking or hydrodesulfurization according to [1], in which the zeolite-type compound is a silicate compound.

[16] The structured catalyst for catalytic cracking or hydrodesulfurization according to [1], having a cylindrical, foliate, dumbbell column, or ring-shaped pellet shape.

[17] The structured catalyst for catalytic cracking or hydrodesulfurization according to [16], in which the average particle size of the structured catalyst is from 100 μm to 15 cm.

[18] A catalytic cracking apparatus including a structured catalyst according to [1].

[19] A hydrodesulfurization apparatus including a structured catalyst according to [1].

[20] A method for producing a structured catalyst for catalytic cracking or hydrodesulfurization, including:

a calcination step of calcining a precursor material (B) obtained by impregnating a precursor material (A) for obtaining a support of a porous structure composed of a zeolite-type compound with a metal-containing solution; and a hydrothermal treatment step of hydrothermally treating a precursor (C) obtained by calcining the precursor material (B).

[21] The method for producing a structured catalyst for catalytic cracking or hydrodesulfurization according to [20], in which from 50 to 500 mass % of a non-ionic surfactant is added to the precursor material (A) before the calcination step.

[22] The method for producing a structured catalyst for catalytic cracking or hydrodesulfurization according to [20], in which the precursor material (A) is impregnated with the metal-containing solution by adding the metal-containing solution to the precursor material (A) in multiple portions before the calcination step.

[23] The method for producing a structured catalyst for catalytic cracking or hydrodesulfurization according to [20], in which in impregnating the precursor material (A) with the metal-containing solution before the calcination step, a value obtained by converting the added amount of the metal-containing solution added to the precursor material (A) to a ratio of silicon (Si) constituting the precursor material (A) to a metal element (M) contained in the metal-containing solution added to the precursor material (A) (a ratio of number of atoms Si/M) is adjusted to from 10 to 1000.

[24] The method for producing a structured catalyst for catalytic cracking or hydrodesulfurization according to [23], in which the metal element (M) contained in the metal-containing solution is any one or two or more of Fe, Al, Zn, Zr, Cu, Co, Ni, Ce, Nb, Ti, Mo, V, Cr, Pd, and Ru.

[25] The method for producing a structured catalyst for catalytic cracking or hydrodesulfurization according to [20], in which in impregnating the precursor material (A) with the metal-containing solution before the calcination step, a value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is adjusted to 10 to 1,000, and a ratio of another metal element (m) contained in the metal-containing solution to the metal element (M) (the ratio of number of atoms m/M) is adjusted to 0.01 to 1.

[26] The method for producing a structured catalyst for catalytic cracking or hydrodesulfurization according to [25], in which the metal element (M) contained in the metal-containing solution is any one or two or more of Fe, Al, Zn, Cu, Co, Ni, Nb, Mo, V, Cr, and Pd, and the other metal element (m) is any one or two or more of Zr, Ti, Ru, and Ce.

[27] The method for producing a structured catalyst for catalytic cracking or hydrodesulfurization according to [20], in which in the hydrothermal treatment step, the precursor material (C) and a structure directing agent are mixed.

[28] The method for producing a structured catalyst for catalytic cracking or hydrodesulfurization according to [20], in which the hydrothermal treatment step is performed in a basic condition.

Advantageous Effects of Disclosure

According to the present disclosure, provided are a structured catalyst for catalytic cracking or hydrodesulfurization that can suppress the decline in catalytic activity, allows efficient catalytic cracking or hydrodesulfurization, and allows stable obtaining of a substance to be modified; and a catalytic cracking apparatus or a hydrodesulfurization apparatus including the structured catalyst.

BRIEF DESCRIPTION OF DRAWINGS

FIG. 1 is a diagram schematically illustrating a structured catalyst for catalytic cracking or hydrodesulfurization according to an embodiment of the present disclosures that the inner structure can be understood.

FIG. 2 is a partial enlarged cross-sectional view for explaining an example of the function of the structured catalyst of FIG. 1.

DESCRIPTION OF EMBODIMENTS

Hereinafter, embodiments of the present disclosure will be described in detail with reference to drawings.

Configuration of Structured Catalyst

FIG. 1 is a diagram schematically illustrating a configuration of a structured catalyst for catalytic cracking or hydrodesulfurization according to an embodiment of the present disclosure. In FIG. 1, A is a perspective view (partially shown in cross-section), and B is a partially enlarged cross-sectional view. Note that the structured catalyst in FIG. 1 is an example of the structured. catalyst, and the shape, dimension, and the like of each of the configurations according to the present disclosure are not limited to those illustrated in FIG. 1.

Figure 1A:
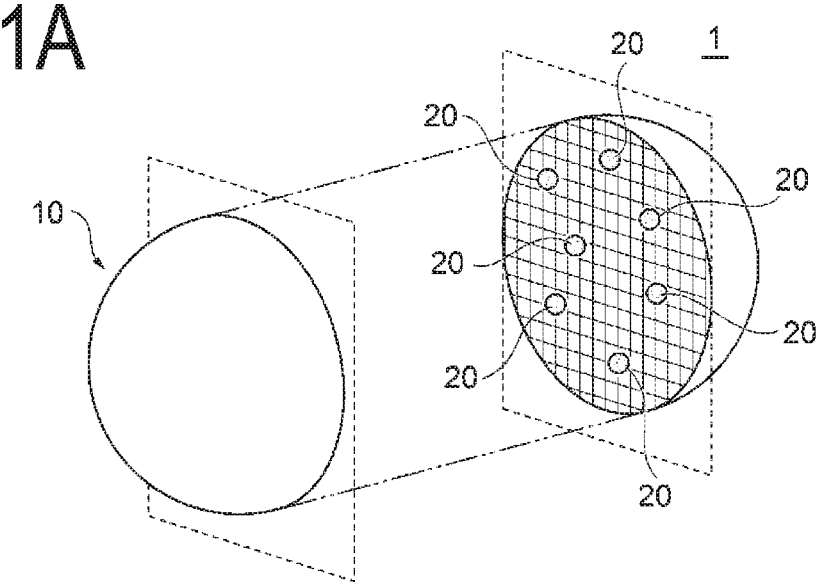
FIG. 1A is a perspective view (partially shown in cross-section)

As illustrated in FIG. 1A, a configuration of a structured catalyst for catalytic cracking or hydrodesulfurization 1 (hereinafter referred to simply as a structured catalyst) includes a support 10 of a porous structure composed of a zeolite-type compound, and at least one type of metal oxide nanoparticles 20 present in the support 10.

In the structured catalyst 1, a plurality of types of metal oxide nanoparticles 20, 20, . . . is embedded in the porous structure of the support 10. The metal oxide nanoparticles 20 may be a substance having catalytic capacity (catalytic activity). The metal oxide nanoparticles are described in detail below.

Figure 1B:
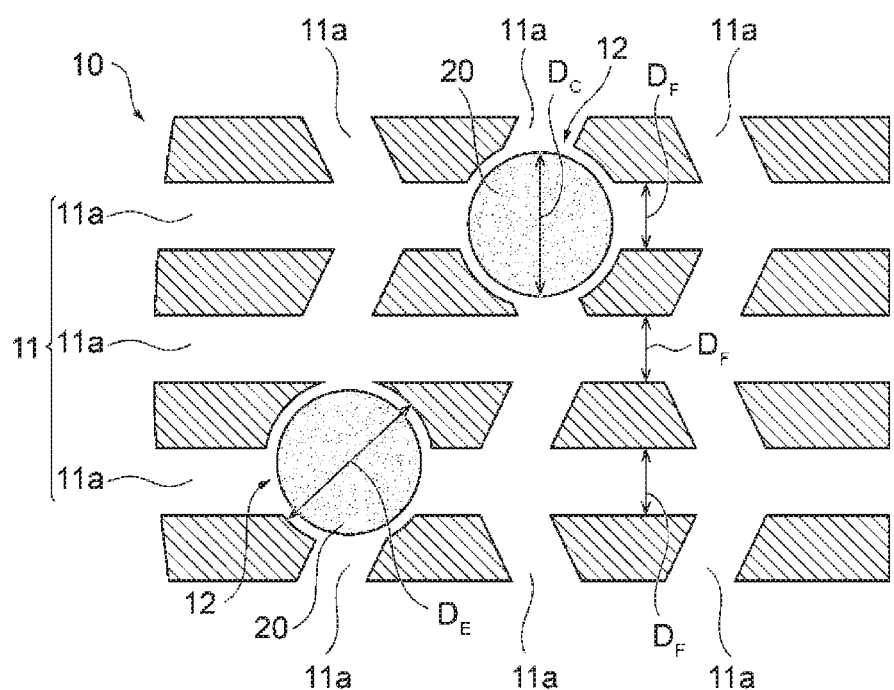
FIG. 1B is a partially enlarged cross-sectional view.

The support 10 has a porous structure, and as illustrated in FIG. 1B, a plurality of pores 11a, 11a, . . . is preferably formed so as to have channels 11 connecting with each other. Here, the metal oxide nanoparticles 20 are present at least in the channels 11 of the support 10, and are preferably held at least in the channels 11 of the support 10.

With such a configuration, movement of the metal oxide nanoparticles 20 within the support 10 is restricted, and aggregation between the metal oxide nanoparticles 20 is effectively prevented. As a result, the decrease in effective surface area of the metal oxide nanoparticles 20 can be effectively suppressed, and the catalytic activity of the metal oxide nanoparticles 20 lasts for a long period of time. In other words, according to the structured catalyst 1, the decline in catalytic activity due to aggregation of the metal oxide nanoparticles 20 can be suppressed, and the life of the structured catalyst 1 can be extended. In addition, due to the long life time of the structured catalyst 1, the replacement frequency of the structured catalyst 1 can be reduced, and the amount of waste of the used structured catalyst 1 can be significantly reduced, and thereby can save resources.

Typically, when the structured catalyst is used in a fluid (e.g., a heavy oil, or modified gas such as NOx, etc.), it can be subjected to an external force from the fluid. In this case, if the catalytic substance is only held in the state of attachment to the outer surface of the support 10, there is a problem in that the catalytic substance is easily detached from the outer surface of the support 10 due to the influence of external force from the fluid. In contrast, in the structured catalyst 1, the metal oxide nanoparticles 20 are held at least in the channels 11 of the support 10, and therefore, even if subjected to an external force caused by a fluid, the metal oxide nanoparticles 20 are less likely detached from the support 10. That is, when the structured catalyst 1 is in the fluid, the fluid flows into the channels 11 from the pore 11a of the support 10, so that the speed of the fluid flowing through the channels 11 is slower than the speed of the fluid flowing on the outer surface of the support 10 due to the flow path resistance (frictional force). Due to the influence of such flow path resistance, the pressure experienced by the metal oxide nanoparticles 20 held in the channels 11 from the fluid is lower than the pressure at which the catalytic substance is received from the fluid outside of the support 10. As a result, detachment of the metal oxide nanoparticles 20 present in the support 11 can be effectively suppressed, and the catalytic activity of the metal oxide nanoparticles 20 can be stably maintained over a long period of time. Note that the flow path resistance as described above is thought to be larger so that the channel 11 of the support 10 has a plurality of bends and branches, and the interior of the support 10 becomes a more complex three-dimensional structure.

Preferably, the channels 11 have any one of a one-dimensional pore, a two-dimensional pore, and a three-dimensional pore defined by the framework of the zeolite-type compound and an enlarged pore portion 12 that is different from any of the one-dimensional pore, the two-dimensional pore, and the three-dimensional pore. At this time, the metal oxide nanoparticles 20 are preferably present at least in the enlarged pore portion 12, and more preferably embedded at least in the enlarged pore portion 12. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels is connected two-dimensionally. The "three-dimensional pore" refers to a three-dimensional channel in which a plurality of one-dimensional channels is connected three-dimensionally.

As a result, movement of the metal oxide nanoparticles 20 within the support 10 is further restricted, and detachment of the metal oxide nanoparticles 20 and aggregation between the metal oxide nanoparticles 20 and 20 are more effectively prevented. Embedding refers to a state in which the metal oxide nanoparticles 20 are included in the support 10. At this time, the metal oxide nanoparticles 20 and the support 10 need not necessarily be in direct contact with each other, but may be indirectly held by the support 10 with other substances (e.g., a surfactant, etc.) interposed between the metal oxide nanoparticles 20 and the support 10.

Although FIG. 1B illustrates the case in which the metal oxide nanoparticles 20 are embedded in the enlarged pore portion 12, the metal oxide nanoparticles 20 are not limited to this configuration only, and the metal oxide nanoparticles 20 may be present in the channels 11 with a portion thereof protruding outward of the enlarged pore portion 12. Furthermore, the metal oxide nanoparticles 20 may be partially embedded in a portion of the channels 11 other than the enlarged pore portion 12 (for example, an inner wall portion of the channels 11), or may be held by fixing, for example.

Additionally, the enlarged pore portion 12 preferably connects with the plurality of pores 11a, 11a constituting any one of the one-dimensional pore, the two-dimensional pore, and the three-dimensional pore. As a result, a separate channel different from the one-dimensional pore, the two-dimensional pore, or the three-dimensional pore is provided in the interior of the support 10, so that the function of the catalytic substance 20 can be further exhibited.

Additionally, the channels 11 are formed three-dimensionally by including a branch portion or a merging portion within the support 10, and the enlarged pore portion 12 is preferably provided in the branch portion or the merging portion of the channels 11.

The average inner diameter $D_F$ of the channels 11 formed in the support 10 is calculated from the average value of the short diameter and the long diameter of the pore 11a constituting any of the one-dimensional pore, the two-dimensional pore, and the three-dimensional pore. For example, it is from 0.1 nm to 1.5 nm, and preferably from 0.5 nm to 0.8 nm.

The inner diameter $D_E$ of the enlarged pore portion 12 is, for example, from 0.5 nm to 50 nm, preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the metal oxide nanoparticles 20 to be embedded. The inner diameter $D_E$ of the enlarged pore portion 12 is sized so that the enlarged pore portion 12 is able to embed the metal oxide nanoparticles 20.

The support 10 is composed of a zeolite-type compound. Examples of zeolite-type compounds include zeolite analog compounds such as zeolites (aluminosilicate salts), cation exchanged zeolites, silicate compounds such as silicalite, aluminoborate salts, aluminoarsenate salts, and germinate salts; and phosphate-based zeolite analog materials such as molybdenum phosphate. Among these, the zeolite-type compound is preferably a silicate compound.

The skeletal structure of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each skeletal structure is formed in the zeolite-type compound. For example, the maximum pore diameter of MFI type is 0.636 nm (6.36 Å) and the average pore diameter is 0.560 nm (5.60 Å).

The metal oxide nanoparticles 20 are described in detail below.

The metal oxide nanoparticles 20 may be primary particles or secondary particles formed by aggregating primary particles, and the average particle size $D_C$ of the nanoparticles 20 is preferably larger than the average inner diameter $D_F$ of the channels 11 and not greater than the inner diameter $D_E$ of the enlarged pore portion 12 ($D_F < D_C \leq D_E$). Such metal oxide nanoparticles are suitably embedded in the enlarged pore portion 12 within the channels 11, and movement of the metal oxide nanoparticles within the support 10 is restricted. Thus, even if the metal oxide nanoparticles are subjected to an external force from a fluid, movement of the metal oxide nanoparticles within the support 10 is suppressed, and contact between the metal oxide nanoparticles embedded in the enlarged pore portions 12, 12, . . . dispersed in the channel 11 of the support 10 is effectively prevented.

The average particle size $D_C$ of the metal oxide nanoparticles is preferably from 0.1 nm to 50 nm, more preferably 0.1 nm or higher and less than 30 nm, and further preferably from 0.5 nm to 14.0 nm, and particularly preferably from 1.0 nm to 3.3 nm for primary particles and second particles. Furthermore, the ratio ($D_C/D_F$) of the average particle size $D_C$ of the metal oxide nanoparticles to the average inner diameter $D_F$ of the channels 11 is preferably from 0.06 to 500, more preferably from 0.1 to 36, even more preferably from 1.1 to 36, and particularly preferably from 1.7 to 4.5.

The metal element (M) of the metal oxide nanoparticles is preferably contained in from 0.5 to 2.5 mass %, and more preferably from 0.5 to 1.5 mass % relative to the structured catalyst 1. For example, when the metal element (M) is Co, the content of the Co element (mass %) is expressed as {(mass of Co element)/(mass of all elements of the structured catalyst 1)}×100.

The metal oxide nanoparticles only need to be constituted of a metal oxide. For example, the metal oxide nanoparticles may be constituted by a single metal oxide, or may be constituted by a mixture of two or more types of metal oxides. Note that in the present specification, the "metal oxide" constituting the metal oxide nanoparticles (as a material) refers to an oxide containing one type of metal element (M) and a complex metal oxide containing two or more types of metal elements (M), and the term is a generic term for oxides containing one or more metal elements (M).

Such metal oxide nanoparticles are composed of a material containing any one or two or more of the oxides of Fe, Al, Zn, Zr, Cu, Co, Ni, Ce, Nb, Ti, Mo, V, Cr, Pd, and Ru.

Additionally, when the metal oxide nanoparticles are complex metal oxide nanoparticles composed of an oxide containing two or more metal oxides, the complex metal oxide nanoparticles preferably include a first metal oxide containing any one or two or more of Fe, Al, Zn, Cu, Co, Ni, Nb, Mo, V, Cr, and Pd, and a second metal oxide containing any one or two or more of Zr, Ti, Ru, and Ce. Examples of the first metal oxide include iron oxide (FeOx), and examples of the second metal oxide include zirconium oxide (ZrOx).

Furthermore, the ratio of silicon (Si) constituting the support 10 to the metal element (M) constituting the metal oxide nanoparticles (the ratio of number of atoms Si/M) is preferably from 10 to 1000, and more preferably from 50 to 200. If the ratio is greater than 1000, the action as the catalytic substance may not be sufficiently obtained, such as low activity. On the other hand, if the ratio is smaller than 10, the ratio of the metal oxide nanoparticles becomes too large, and the strength of the support 10 tends to decrease. Note that the metal oxide nanoparticles, which are present in the interior of the support 10 or are supported, do not include metal oxide nanoparticles adhered to the outer surface of the support 10.

When the metal oxide nanoparticles are the complex metal oxide nanoparticles, the ratio of silicon (Si) constituting the support 10 to the metal element (M) constituting the first metal oxide (the ratio of number of atoms Si/M) is preferably from 10 to 1000, and the ratio of the other metal element (In) to the metal element (M) constituting the second metal oxide (the ratio of number of atoms m/M) is preferably from 0.01 to 1.

Catalytic Activity of Structured Catalyst

The structured catalyst 1 includes a support 10 of a porous structure and at least one type of metal oxide nanoparticles 20 present in the support 10, as described above. The structured catalyst 1 exhibits catalytic activity according to the metal oxide nanoparticles 20 by bringing the metal oxide nanoparticles 20 present in the support into contact with a fluid. Specifically, the fluid in contact with the outer surface 10a of the structured catalyst 1 flows into the support 10 through the pore 11a formed in the outer surface 10a and guided into the channels 11, moves through the channels 11, and exits to the exterior of the structured catalyst 1 through the other pore 11a. In the pathway through which fluid travels through the channels 11, contacting with the metal oxide nanoparticles 20 held in the channels 11 results in a reaction (e.g., a catalytic reaction) depending on the catalytic activity of the metal oxide nanoparticles 20. In addition, the structured catalyst 1 has molecular sieving capability due to the support having a porous structure. The structured catalyst 1 has a molecular sieving capability that passes through a predetermined molecule contained in a heavy oil such as crude oil or a residual oil.

Figure 2A:
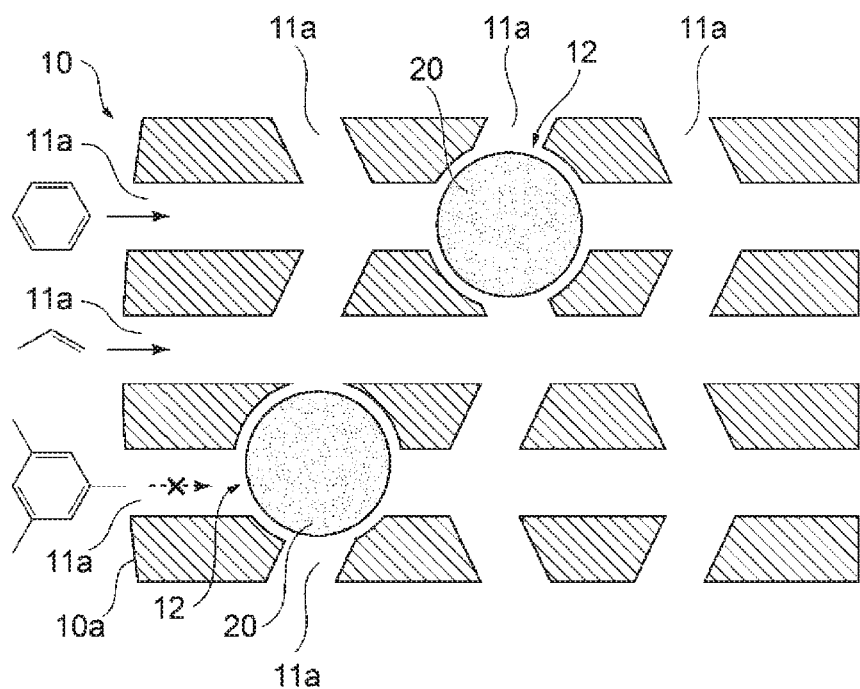
FIG. 2A is a diagram illustrating the function of a sieve.

Firstly, the molecular sieving capability of the structured catalyst 1 is described using FIG. 2A, in which the fluid is, for example, a liquid containing benzene, propylene, and mesitylene. As illustrated in FIG. 2A, a compound (e.g., benzene, propylene) constituted by molecules having a size that is less than or equal to the pore diameter of the pore 11a, in other words, less than or equal to the inner diameter of the channels 11, can enter into the support 10. On the other hand, a compound made up of molecules having a size exceeding the pore diameter of the pore 11a (for example, mesitylene) cannot enter into the support 10. In this way, when the fluid contains a plurality of types of compounds, the reaction of compounds that cannot enter into the support 10 is restricted, and a compound capable of entering into the support 10 is allowed to react.

Of the compounds produced in the support 10 by the reaction, only compounds composed of molecules having a size less than or equal to the pore diameter of the pore 11a can exit through the pore 11a to the exterior of the support 10, and are obtained as reaction products. On the other hand, a compound that cannot exit to the exterior of the support 10 from the pore 11a can be released to the exterior of the support 10 after being converted into a compound made up of molecules sized to be able to exit to the exterior of the support 10. In this way, a specified reaction product can be selectively obtained by using the structured catalyst 1.

Figure 2B:
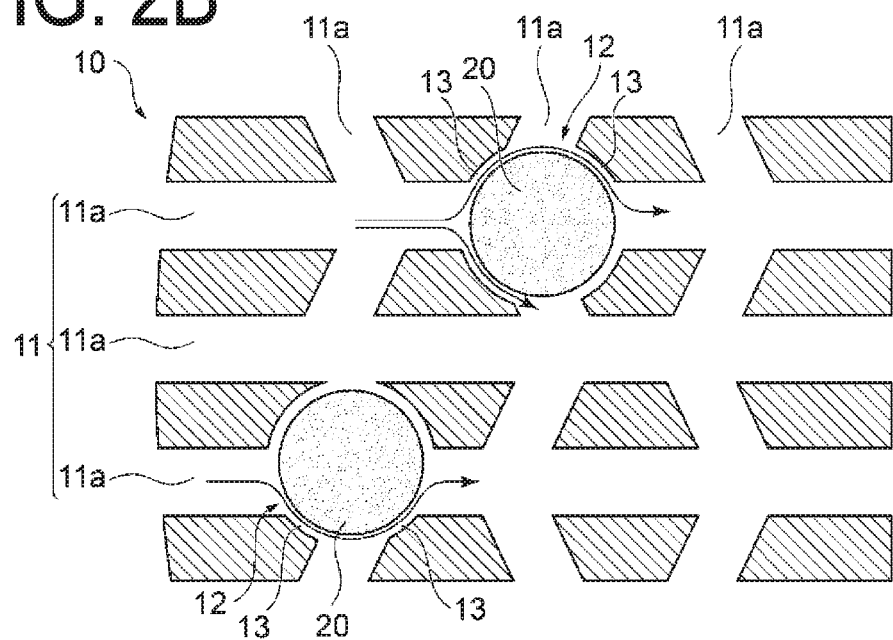
FIG. 2B is a diagram illustrating the catalytic function.

In the structured catalyst 1, as illustrated in FIG. 2B, the metal oxide nanoparticles 20 are suitably embedded in the enlarged pore portion 12 of the channels 11. When the metal oxide nanoparticles 20 are metal oxide nanoparticles, when the average particle size $D_C$ of the metal oxide nanoparticles is larger than the average inner diameter $D_F$ of the channels 11 and smaller than the inner diameter $D_E$ of the enlarged pore portion 12 ($D_F<D_C<D_E$), a small channel 13 is formed between the metal oxide nanoparticles and the enlarged pore portion 12. Thus, as indicated by the arrow in FIG. 2(b), the fluid entering the small channel 13 comes into contact with the metal oxide nanoparticles. Because each metal oxide nanoparticle is embedded in the enlarged pore portion 12, movement within the support 10 is restricted. As a result, aggregation between the metal oxide nanoparticles in the support 10 is prevented. As a result, a large contact area between the metal oxide nanoparticles and the fluid can be stably maintained.

Specifically, when the molecule that has entered into the channels 11 contacts the metal oxide nanoparticles 20, the molecule (substance to be modified) is modified by a catalytic cracking reaction by one metal oxide (first metal oxide) of the metal oxide nanoparticles 20. For example, when the one metal oxide (e.g., iron oxide) is used as a catalyst, one heavy oil is decomposed to produce other a plurality of heavy oils. Alternatively, a plurality of light oils may be produced from one heavy oil, or other heavy and a light oil may be produced from one heavy oil. By performing catalytic cracking with a metal oxide catalyst in this manner, the heavy component can be modified to other heavy oils, light oils, and the like.

In addition, due to the decomposition of the heavy oil due to the catalytic cracking reaction, radicals are generated in the cleaved portion of the heavy or light oil after decomposition, and the heavy oil or light oil after decomposition is unstable due to the presence of these radicals. When the metal oxide nanoparticles 20 include other metal oxide (second metal oxide) (e.g., zirconium oxide) other than the one metal oxide, the catalytic function of the other metal oxide generates hydrogen from moisture, such as water vapor, present in the vicinity of the metal oxide nanoparticles 20. Therefore, even if hydrogen gas is not separately supplied to the structured catalyst as in prior art, hydrogen molecules can be generated by supplying moisture to the structured catalyst (in particular, the second metal oxide), and hydrogen molecules are supplied to the radicals generated in the cleavage portion to quench the radicals, whereby the heavy or light oil after decomposition is stabilized.

Furthermore, the metal oxide nanoparticles 20 can be used in a hydrodesulfurization reaction other than the catalytic cracking reaction described above. Specifically, when the molecule that has entered into the channel 11 contact the metal oxide nanoparticles 20, the molecule (substance to be modified) is modified by a desulfurization reaction that occurs in a hydrogen molecular environment. Hydrodesulfurization with the metal oxide nanoparticles 20 in this manner allows modification of a crude oil, a heavy oil, and the like.

Method for Producing Structured Catalyst

Figure 3:
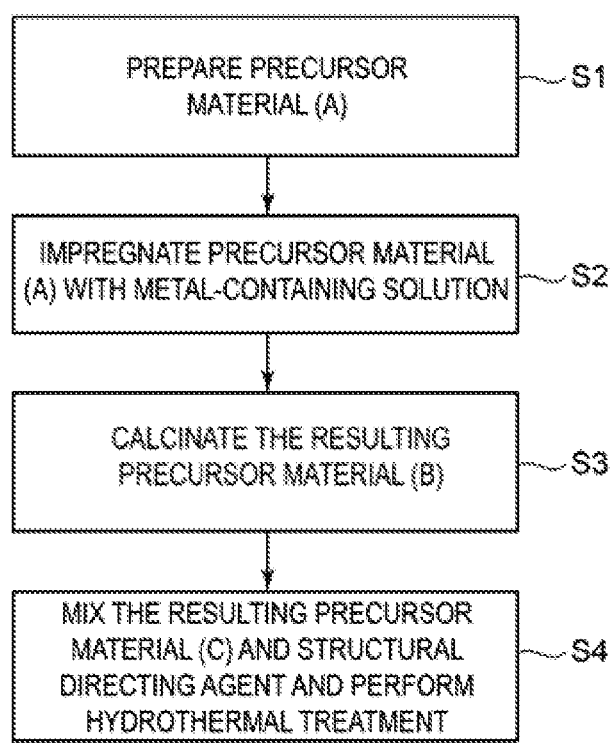
FIG. 3 is a flowchart illustrating an example of a method for producing the structured catalyst of FIG. 1.

FIG. 3 is a flowchart illustrating a method for producing the structured catalyst 1 of FIG. 1. An example of the method for producing the structured catalyst will be described below as an example of the case in which the catalytic substance present in the support is made of metal oxide nanoparticles.

Step S1: Preparation Step

As illustrated in FIG. 3, firstly, the precursor material (A) is prepared for obtaining a support of a porous structure composed of a zeolite-type compound. The precursor material (A) is preferably a regular mesopore material, and can be appropriately selected according to the type (composition) of the zeolite-type compound constituting the support of the structured catalyst.

Here, when the zeolite-type compound constituting the support of the structured catalyst is a silicate compound, the regular mesopore material is preferably a compound including a Si—O skeleton in which pores having a pore diameter of 1 to 50 nm are uniformly sized and regularly developed one-dimensionally, two-dimensionally, or three-dimensionally. While such a regular mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is recovered (e.g., filtered), washed and dried as necessary, and then calcined to obtain a precursor material (A) which is a powdered regular mesopore material. Here, examples of the solvent of the mixed solution that can be used include water, an organic solvent such as alcohol, or a mixed solvent thereof. In addition, the raw material is selected according to the type of the support, and examples thereof include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable when producing MCM-41. The hydrothermal treatment can be performed at 0 to 2000 kPa at 80 to 800° C. for 5 hours to 240 hours in a sealed container. The calcination treatment can be performed, for example, in air at 350 to 850° C. for 2 hours to 30 hours.

Step S2: Impregnating Step

The prepared precursor material (A) is then impregnated with the metal-containing solution to obtain the precursor material (B).

The metal-containing solution is a solution containing a metal component (e.g., a metal ion) corresponding to the metal element (M) constituting the metal oxide nanoparticles of the structured catalyst, and can be prepared, for example, by dissolving a metal salt containing a metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal-containing solution is not particularly limited; however, for example, the metal-containing solution is preferably added to portions in a plurality of times while mixing the powdered precursor material (A) before the calcination step described below. In addition, the surfactant is preferably added to the precursor material (A) as the additive before adding the metal-containing solution to the precursor material (A) from the perspective of allowing the metal-containing solution to enter the pores of the precursor material (A) more easily. It is believed that such additives serve to cover the outer surface of the precursor material (A) and inhibit the subsequently added metal-containing solution from adhering to the outer surface of the precursor material (A), making it easier for the metal-containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal-containing solution into the pores. As the method for adding the non-ionic surfactant, for example, it is preferable to add from 50 to 500 mass % of the non-ionic surfactant to the precursor material (A) before the calcination step described below. If the added amount of the non-ionic surfactant to the precursor material (A) is less than 50 mass %, the aforementioned suppressing action will not easily occur, and when greater than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal-containing solution added to the precursor material (A) is preferably adjusted as appropriate in consideration of the amount of the metal element (M) contained in the metal-containing solution with which the precursor material (A) is impregnated (that is, the amount of the metal element (M) present in the precursor material (B)). For example, before the calcination step described below, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is preferably adjusted to 10 to 1,000, and more preferably 50 to 200. For example, if the surfactant is added to the precursor material (A) as the additive before adding the metal-containing solution to the precursor material (A), when the value obtained by converting the added amount of the metal-containing solution added to the precursor material (A) to the ratio of number of atoms Si/M is from 50 to 200, from 0.5 to 2.5 mass % of the metal element of the metal oxide nanoparticles can be included in the structured catalyst. In this case, the metal element (M) contained in the metal-containing solution is any one or two or more of Fe, Al, Zn, Zr, Cu, Co, Ni, Ce, Nb, Ti, Mo, V, Cr, Pd, and Ru, and is an element that constitutes a metal oxide of the metal oxide nanoparticles. In the state of the precursor material (B), the amount of the metal element (M) present within the pores is generally proportional to the added amount of the metal-containing solution added to the precursor material (A) if the metal concentration of the metal-containing solution, the presence or absence of additives, and other conditions such as temperature, pressure, and the like are the same. The amount of the metal element (M) present in the precursor material (B) is in a proportional relationship to the amount of the metal element constituting the metal oxide nanoparticles present in the support of the structured catalyst. Thus, by controlling the added amount of the metal-containing solution added to the precursor material (A) to the range described above, the pores of the precursor material (A) can be sufficiently impregnated with the metal-containing solution, and thus the amount of metal oxide nanoparticles present in the support of the structured catalyst can be adjusted.

Furthermore, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is adjusted to from 10 to 1000, preferably 50 to 200, and the ratio of the other metal element (m) contained in the metal-containing solution to the metal element (M) (the ratio of number of atoms m/M) is adjusted to from 0.01 to 1. In this case, the metal element (M) contained in the metal-containing solution is any one or two or more of Fe, Al, Zn, Cu, Co, Ni, Nb, Mo, V, Cr, and Pd, and is an element constituting the first metal oxide contained in the complex metal oxide nanoparticles. Furthermore, the other metal element (m) contained in the metal-containing solution is any one or two or more of Zr, Ti, Ru, and Ce, and is an element constituting the second metal oxide contained in the complex metal oxide nanoparticles.

After impregnating the precursor material (A) with the metal-containing solution, a washing treatment may be performed as necessary. Examples of the solvent of the washing solution that can be used include water, an organic solvent such as alcohol, or a mixed solution thereof. Furthermore, the precursor material (A) is preferably impregnated with the metal-containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which there is a large amount of moisture remaining in the metal-containing solution and the wash solution in the precursor material (A), the skeletal structure as the regular mesopore material of the precursor material (A) may be broken, and thus it is preferable to dry them sufficiently.

Step S3: Calcination Step

Next, a precursor material (C) is obtained by calcining the precursor material (B) obtained by impregnating the precursor material (A) for obtaining the support of the porous structure composed of a zeolite-type compound with the metal-containing solution.

The calcination treatment is preferably performed, for example, in air at 350 to 850° C. for 2 hours to 30 hours. The metal component that has entered the pores of the regular mesopore material undergoes crystal growth by such a calcination treatment, and metal oxide nanoparticles are formed in the pores.

Step S4: Hydrothermal Treatment Step

A mixed solution of the precursor material (C) and the structure directing agent is then prepared, and the precursor material (C) obtained by calcining the precursor material (B) is hydrothermally treated to obtain a structured catalyst.

The structure directing agent is a molding agent for defining the skeletal structure of the support of the structured catalyst, and may be, for example, a surfactant. The structure directing agent is preferably selected according to the skeletal structure of the support of the structured catalyst, and is preferably a surfactant such as tetramethylammonium bromide (TMABr), tetraethylammonium bromide (TEABr), and tetrapropylammonium bromide (TPABr).

The mixing of the precursor material (C) and the structural directing agent may be performed during the hydrothermal treatment step or may be performed before the hydrothermal treatment step. Furthermore, the method for preparing the mixed solution is not particularly limited, and the precursor material (C), the structural directing agent, and the solvent may be mixed simultaneously, or each of the dispersion solutions may be mixed after the precursor material (C) and the structural directing agent are each dispersed in individual solutions. Examples of the solvent that can be used include water, an organic solvent such as alcohol, or a mixed solvent thereof. In addition, it is preferable that the pH of the mixed solution is adjusted using an acid or a base before performing the hydrothermal treatment.

The hydrothermal treatment can be performed by a known method. For example, the hydrothermal treatment can be preferably performed at 0 to 2000 kPa at 80 to 800° C. for 5 hours to 240 hours in a sealed container. Furthermore, the hydrothermal treatment is preferably performed under a basic condition. Although the reaction mechanism here is not necessarily clear, by performing hydrothermal treatment using the precursor material (C) as a raw material, the skeletal structure as the regular mesopore material of the precursor material (C) becomes increasingly disrupted. However, the action of the structure directing agent forms a new skeletal structure (porous structure) as the support of the structured catalyst while maintaining the position of the metal oxide nanoparticles within the pores of the precursor material (C). The structured catalyst obtained in this way includes a support having a porous structure and metal oxide nanoparticles present in the support, and the support has a channels in which the plurality of pores connect with each other by the porous structure, and at least a portion of the metal oxide nanoparticles are present in the channels of the support.

Furthermore, in the present embodiment, in the hydrothermal treatment step, a mixed solution in which the precursor material (C) and the structural directing agent are mixed is prepared, and the precursor material (C) is subjected to hydrothermal treatment, which is not a limitation. The precursor material (C) may be subjected to hydrothermal treatment without mixing the precursor material (C) and the structural directing agent.

The precipitate obtained after hydrothermal treatment (structured catalyst) is preferably washed, dried, and calcined as necessary after recovery (e.g., filtration). Examples of the washing solution that can be used include water, an organic solvent such as alcohol, or a mixed solution thereof. Drying treatments include overnight natural drying and high temperature drying at 150° C. or lower. Note that when calcination treatment is performed in the state in which there is a large amount of moisture remaining in the precipitate, the skeletal structure as a support of the structured catalyst may be broken, and thus it is preferable to dry the precipitate sufficiently. For example, the calcination treatment can be also performed in air at 350 to 850° C. for 2 hours to 30 hours. Such calcination treatment burns out the structure directing agent that has been attached to the structured catalyst. Furthermore, the structured catalyst can be used as is without subjecting the recovered precipitate to calcination, depending on the intended use. For example, if the environment in which the structured catalyst is used is a high temperature environment of an oxidizing atmosphere, exposing the structured catalyst to a usage environment for a period of time allows the structure directing agent to be burned out and to obtain a structured catalyst similar to that when subjected to calcination treatment. Thus, the obtained structured catalyst can be used as is.

Modified Example of Structured Catalyst 1

Figure 4:
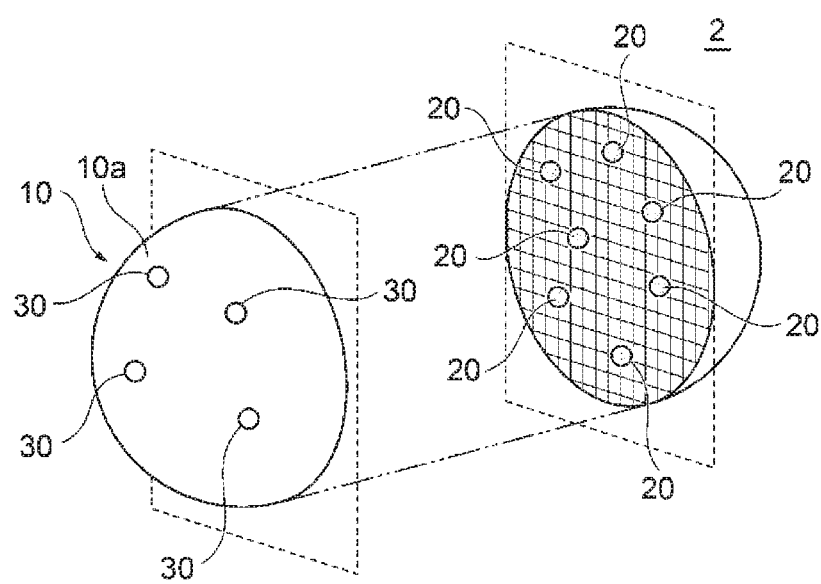
FIG. 4 is a schematic view illustrating a modified example of the structured catalyst of FIG. 1.

FIG. 4 is a schematic view illustrating a modified example of the structured catalyst 1 in FIG. 1.

Although the structured catalyst 1 of FIG. 1 illustrates the case in which it includes the support 10 and the metal oxide nanoparticles 20 present in the support 10, the structured catalyst 1 is not limited to this configuration. For example, as illustrated in FIG. 4, the structured catalyst 2 may further include at least one type of other metal oxide nanoparticles 30 held on the outer surface 10a of the support 10.

The metal oxide nanoparticles 30 are made of a substance that exhibits one or more catalytic capacities. The catalytic capacities of the other type of metal oxide nanoparticles 30 may be the same or different from the catalytic capacity of the metal oxide nanoparticles 20. Also, if both of the metal oxide nanoparticles 20 and 30 are made of materials having the same catalytic capacity, the material of the other type of metal oxide nanoparticles 30 may be the same as or different from the material of the metal oxide nanoparticles 20. According to this configuration, the content of the catalytic substance held in the structured catalyst 2 can be increased, and the catalytic activity of the catalytic substance can be further accelerated.

In this case, the content of the metal oxide nanoparticles 20 present in the support 10 is preferably greater than that of the other metal oxide nanoparticles 30 held on the outer surface 10a of the support 10. As a result, the catalytic capacity of the metal oxide nanoparticles 20 held in the support 10 becomes dominant, and the catalytic capacity of the catalytic substances is stably exhibited.

According to the present embodiment, aggregation (sintering) between the metal oxide nanoparticles 20 can be prevented. Additionally, since the metal oxide nanoparticles 20 are composed of a material containing any one or two or more of the oxides of Fe, Al, Zn, Zr Cu Cu Co, Ni, Ce, Nb, Ti, Mo, V, Cr, Pd and Ru, hydrogen can be generated from moisture by any one or a plurality of catalytic functions of these metal oxides, and radicals generated in the cleaved portion of the heavy oil or light oil after decomposition can be dissipated by supplying hydrogen to the radicals, and the heavy oil or light oils after decomposition can be stabilized. Furthermore, there is no need to supply hydrogen gas to quench the radicals in the heavy or light oil after decomposition compared to prior art catalytic cracking. Accordingly, decline in catalytic activity can be suppressed and efficient catalytic cracking can be achieved, and a substance to be modified can be simply and stably obtained.

Also, the metal oxide nanoparticles 20 are complex metal oxide nanoparticles composed of a material containing two or more metal oxides, and the complex metal oxide nanoparticles includes a first metal oxide containing any one or two or more of the oxides of Fe, Al, Zn, Cu, Co, Co, Ni, Nb, Mo, Cr, and Pd, and a second metal oxide containing any one or two or more of the oxides of Zr, Ti, Ru, and Ce, so that interaction between the hydrocarbon decomposition capacity of the first metal oxide and the water decomposition capacity of the second metal oxide (in a case where water is reduced, hydrogen production capacity) further suppress the decline in catalytic activity and achieves a more efficient catalytic cracking, and allows more simple and stable obtaining of a substance to be modified.

In addition, because the average particle size $D_C$ of the metal oxide nanoparticles 20 is greater than the average inner diameter $D_F$ of the channels 11 and is less than or equal to the inner diameter $D_E$ of the enlarged pore portion 12, the metal oxide nanoparticles 20 can be reliably embedded within the enlarged pore portion 12, and aggregation between the metal oxide nanoparticles 20 is reliably prevented. Furthermore, the effective surface area of the catalyst can be widely ensured, so that the catalytic function of the metal oxide nanoparticles 20 can be maximized.

In particular, the use of the structured catalyst 1 in modification of heavy components allows acceleration of catalytic cracking of heavy components that were not sufficiently used, and improvement of the yields of desulfurized naphtha, desulfurized kerosene, desulfurized light oil, desulfurized heavy oil, and the like.

Hereinbefore, the structured catalyst according to the present embodiments has been described, but the present disclosure is not limited to the above embodiments, and various modifications and changes are possible on the basis of the technical concept of the present disclosure.

For example, in the embodiment described above, the appearance of the structured catalyst is a powder, but the structured catalyst is not limited thereto, and may have a cylindrical, foliate, dumbbell column, or ring-shaped pellet shape. The method for molding the structured catalyst for obtain the above-described shape is not particularly limited, and common methods such as extrusion molding, tableting, and oil granulation may be used. Furthermore, for example, the structured catalyst composed of at least one type of secondary particles having a desired secondary particle size may be obtained by molding a catalyst powder using a single shaft press to make a structured catalyst, followed by passing the catalytic molding through a sieve while crushing. A structured catalyst in a granulated state obtained by the above-described method may be referred to as a structured catalyst or a catalytic molding. When the structured catalyst is granulated, for example, a structured catalyst having an average particle size (or an average equivalent to a circle diameter), for example, from 100 μm to 15 cm can be molded. For increasing the size of the structured catalyst to over several centimeters, a binder such as alumina may be mixed and molded. The above-described shape and size of the structured catalyst or catalytic molding prevent clogging of catalytic layers by heavy oil components in desulfurization of crude oil, heavy oil, or distilled fractions of crude oil.

Furthermore, a catalytic cracking apparatus including the structured catalyst for catalytic cracking may be provided. The catalytic cracking apparatus includes, for example, a reactor disposed downstream of the distillation apparatus in a petroleum refining plant, a substance supply unit that supplies a substance separated by a distillation apparatus to the reactor, and a product discharge unit that discharges the product produced by the decomposition reaction. A structured catalyst for catalytic cracking may be used in a reactor of the apparatus having such a configuration. Furthermore, a hydrodesulfurization apparatus having the above-described structured catalyst for hydrodesulfurization may be provided. The hydrodesulfurization apparatus includes, for example, a reactor disposed downstream of the distillation apparatus in a petroleum refining plant, the reactor including a substance supply unit to which a substance (hydrocarbon) separated by a distillation apparatus is supplied, a moisture supply unit to which moisture is supplied, and a product discharge unit that discharges the product produced by the desulfurization reaction. A structured catalyst for hydrodesulfurization may be used in the apparatus having such a configuration.

That is, an oil, a heavy oil, or a fraction thereof can be treated by catalytic cracking and hydrodesulfurization by subjecting the above-described structured catalyst to a step of supplying a crude oil, a heavy oil, or a fraction thereof, and a step of supplying moisture to the structured catalyst. For example, the same effect as described above can be achieved by using the above-described structured catalyst in a catalytic cracking apparatus or a hydrodesulfurization apparatus, and subjecting a crude oil, a heavy oil, or a distilled fraction thereof to catalytic cracking or hydrodesulfurization using the catalytic cracking apparatus or the hydrodesulfurization apparatus.

EXAMPLES

Example 1 to 384

Synthesis of Precursor Material (A)

A mixed aqueous solution was prepared by mixing a silica agent (tetraethoxysilane (TEOS), available from Wako Pure Chemical Industries, Ltd.) and a surfactant as the molding agent. The pH was adjusted as appropriate, and hydrothermal treatment was performed at 80 to 350° C. for 100 hours in a sealed container. Thereafter, the produced precipitate was filtered out, washed with water and ethanol, and then calcined in air at 600° C. for 24 hours to obtain the precursor material (A) of the type and having the pore diameter shown in Tables 1 to 8. Note that the following surfactant was used depending on the type of the precursor material (A).

MCM-41: Hexadecyltrimethylammonium bromide (CTAB) (manufactured by Wako Pure Chemical Industries, Ltd.)

SBA-1: Pluronic P123 (available from BASF)

Fabrication of Precursor Material (B) and (C)

Next, a metal-containing aqueous solution was prepared by dissolving a metal salt containing the metal element (M) in water according to the metal element (M) constituting the metal oxide nanoparticles of the type shown in Tables 1 to 8. Note that the metal salt was used in accordance with the type of metal oxide nanoparticles ("metal oxide nanoparticles: metal salt").

$CoO_x$: Cobalt nitrate (II) hexahydrate (available from Wako Pure Chemical Industries, Ltd.)

$NiO_x$: Nickel nitrate (II) hexahydrate (available from Wako Pure Chemical Industries, Ltd.)

$FeO_x$: Iron nitrate (III) nonahydrate (available from Wako Pure Chemical Industries, Ltd.)

$CuO_x$: Copper nitrate (II) trihydrate (available frog Wako Pure Chemical Industries, Ltd.)

$ZrO_x$: Zirconium nitrate dihydrate (available from Wako Pure Chemical Industries, Ltd.)

Next, a metal-containing aqueous solution was added to the powdered precursor material (A) in portions, and dried at room temperature (20° C.±10° C.) for 12 hours or longer to obtain the precursor material (B).

Note that when the presence or absence of additives shown in Tables 1 to 8 is "yes", pretreatment in which an aqueous solution of polyoxyethylene (15) oleyl ether (NIKKOL BO-15 V, available from Nikko Chemicals Co., Ltd.) is added as the additive to the precursor material (A) before adding the metal-containing aqueous solution, and then the metal-containing aqueous solution was added as described above. Note that when "no" is used in the presence or absence of an additive, pretreatment with an additive such as that described above has not been performed.

Furthermore, the added amount of the metal-containing aqueous solution added to the precursor material (A) was adjusted so that the value obtained by converting to a ratio of silicon (Si) constituting the precursor material (A) to a metal element (M) included in the metal-containing aqueous solution is in Tables 1 to 8. At this time, a mixture of cobalt nitrate (II) hexahydrate, nickel nitrate (II) hexahydrate, iron nitrate (II) nonhydrate, or copper nitrate (II) trihydrate in an amount to give Si/M=1000, 500, 200, or 100, and zirconium nitrate dihydrate in an amount to give Zr/M=0.1 (the ratio of number of atoms m/M) was dropped.

Next, the precursor material (B) impregnated with the metal-containing aqueous solution obtained as described above was calcined in air at 600° C. for 24 hours to obtain the precursor material (C).

Synthesis of Structured Catalyst

The precursor material (C) obtained as described above and the structural directing agent shown in Tables 1 to 8 were mixed to produce a mixed aqueous solution. Hydrothermal treatment was performed under the conditions of at 80 to 350° C., at pH and time shown in Tables 1 to 8 in a sealed container. Thereafter, the produced precipitate was filtered out, washed with water, dried at 100° C. for 12 hours or longer, and further calcined in air at 600° C. for 24 hours to obtain the catalytic structural bodies having the supports shown in Tables 1 to 8 and metal oxide nanoparticles (M 0.9 Zr 0.1 alloy nanoparticles) as the catalytic substance (Examples 1 to 384).

Comparative Example 1

In Comparative Example 1, cobalt oxide powder (II, III) having an average particle size of 50 nm or less (manufactured by Sigma-Aldrich Japan LLC) was mixed with MFI type silicalite, and a functional structural body in which cobalt oxide nanoparticles were attached as the functional substance to the outer surface of the silicalite as the skeletal body. MFI type silicalite was synthesized in the similar manner as in Examples 52 to 57 except for a step of adding a metal.

Comparative Example 2

In Comparative Example 2, MFI type silicalite was synthesized in the similar manner as in Comparative Example 1 except that the step of attaching the cobalt oxide nanoparticles was omitted.

Evaluation

Various characteristic evaluations were performed on the catalytic structural bodies of the above examples and the silicalite of Comparative Example 1 under the conditions described below.

[A] Cross Sectional Observation

Observation samples were produced using a pulverization method for the catalytic structural bodies of the above examples including supports and catalytic substances and the silicalite of Comparative Example 1, and the cross-sectional observation was performed using a transmission electron microscope (TEM) (TITAN G2, available from FEI).

As a result, it was confirmed that, in the catalytic structural bodies of the examples described above, the catalytic substance was present and held in the support made of silicalite or zeolite. On the other hand, in the silicalite of the comparative example, the catalytic substance was only attached to the outer surface of the support and was not present in the support.

In addition, of the examples described above, the structured catalyst in which the metal oxide was CoOx/ZOx nanoparticles was cut by FIB (focused ion beam) processing to give a cross section, and the elemental analysis was performed using SEM (SU8020, manufactured by Hitachi High-Technologies Corporation), EDX (X-Max, available from Horiba, Ltd.), and HR-GDMS (available from AMETEK Co., Ltd., Model Nu AstruM); Co and Zr elements were detected.

It was confirmed that CoOx/ZrOx nanoparticles were present in the support from the results of the cross-sectional observation using TEM, SEM/EDX, and GDMS.

[B] Average Inner Diameter of the Channels of the Support and Average Particle Size of the Catalytic Substance In the TEM image taken by the cross-sectional observation performed in evaluation [A] above, 500 channels of the support were randomly selected, and the respective major diameter and the minor diameter were measured, and the respective inner diameters were calculated from the average values (N=500), and the average value of the inner diameter was determined to be the average inner diameter $D_F$ of the channels of the support. Also for the catalytic substances, 500 catalytic substances were randomly selected from the TEM image, and the respective particle sizes were measured (N=500), and the average value thereof was determined to be the average particle size $D_C$ of the catalytic substance. The results are shown in Tables 1 to 8.

Also, SAXS (small angle X-ray scattering) was used to analyze the average particle size and dispersion status of the catalytic substance. Measurements by SAXS were performed using a Spring—8 beam line BL19B2. The obtained SAXS data was fitted with a spherical model using the Guinier approximation method, and the particle size was calculated. The particle size was measured for the structured catalyst in which the metal oxide was FeOx/ZrOx nanoparticles. Furthermore, as a comparative reference, a commercially available $Fe_2O_3$ nanoparticles (available from Wako Pure Chemical Industries, Ltd.) was observed and measured on SEM.

As a result, in commercial products, various sizes of $Fe_2O_3$ nanoparticles were randomly present in a range of particle sizes of approximately 50 nm to 400 nm, whereas in the measurement results of SAXS, scattering peaks with particle sizes of 10 nm or less were also detected in the catalytic structural bodies of each example having an average particle size of 1.2 nm to 2.0 nm determined from the TEM image. From the results of SAXS measurement and the SEM/EDX cross-sectional measurement, it was found that catalytic substances having a particle size of 10 nm or less were present in the support in a highly dispersed state with a uniform particle size.

[C] Relationship Between the Added Amount of the Metal-Containing Solution and the Amount of Metal Embedded in the Support A structured catalyst in which metal oxide nanoparticles were embedded in the support at added amount of the ratio of number of atoms of Si/M=50, 100, 200, 1000 (M=Co, Ni, Fe, and Cu) was produced, and then the amount of metal (mass %) that was embedded in the support of the structured catalyst produced at the above added amounts was measured. In the present measurement, the catalytic structural bodies having the ratios of number of atoms of Si/M=100, 200, and 1000 were produced by adjusting the added amount of the metal-containing solution in the same manner as the catalytic structural bodies having the ratios of number of atoms of Si/M=100, 200, and 1000 of Examples 1 to 384, and the structured catalyst having the ratio of number of atoms of Si/M=50 was produced in the same manner as the structured catalyst with the ratios of number of atoms of Si/M=100, 200, and 1000, except that the added amount of the metal-containing solution was changed.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", available from SSI Nanotechnology) was performed under conditions of a vacuum atmosphere, an accelerating voltage 15 kV (using a Cr filter), or an accelerating voltage 50 kV (using a Pb filter).

XRF is a method for calculating the amount of metal present in terms of fluorescence intensity, and XRF alone cannot calculate a quantitative value (in terms of mass %). Therefore, the metal content of the structured catalyst to which the metal was added at Si/M=100 was determined by ICP analysis, and the metal content of the structured catalyst in which the metal was added at Si/M=50 and less than 100 was calculated based on XRF measurement results and ICP measurement results.

As a result, it was confirmed that the amount of the metal embedded in the structured catalyst increased as the added amount of the metal-containing solution increased, at least within the range in which the ratio of numbers of atom was from 50 to 1000.

[D] Performance Evaluation

The catalytic capacity (performance) of the catalytic substances (catalytic substance) was evaluated for the catalytic structural bodies of the examples described above and the silicalite of the comparative examples. The results are shown in Tables 1 to 8.

(1) Catalytic Activity

The catalytic activity was evaluated under the following conditions:

First, 0.2 g of the structured catalyst was charged in a normal pressure flow reactor, and a decomposition reaction of butylbenzene (model material for heavy oil) was performed with nitrogen gas ($N_2$) as a carrier gas (5 ml/min) at 400° C. for 2 hours.

After completion of the reaction, the generated gas and the generated liquid that were collected were analyzed by gas chromatography (GC) and gas chromatography mass spectrometry (GC/MS) for the composition. Note that, as the analysis device, TRACE 1310 GC (available from Thermo Fisher Scientific Inc., detector: thermal conductivity detector, flame ionization detector), and TRACE DSQ (Thermo Fischer Scientific Inc., detector: mass detector, ionization method: EI (ion source temperature 250° C., MS transfer line temperature of 320° C.)) were used.

Furthermore, based on the results of the component analysis described above, the yield (mol %) of a compound having a molecular weight lower than that of butylbenzene (specifically, benzene, toluene, ethylbenzene, styrene, cumene, methane, ethane, ethylene, propane, propylene, butane, butene, and the like) was calculated. The yield of the compound was calculated as the percentage (mol %) of the total amount (mol) of the amount of the compound having a lower molecular weight than the butylbenzene contained in the production liquid (mol %) relative to the amount of butylbenzene material (mol) before the reaction.

In the present example, when the yield of a compound having a molecular weight lower than that of butylbenzene contained in the product liquid is 40 mol % or greater, it is determined that catalyst activity (resolution) is excellent, and considered as "A". When it is 25 mol % or more and less than 40 mol %, it is determined that catalyst activity is good, and considered as "B". When it is 10 mol % or more and less than 25 mol %, it is determined that catalyst activity is not good, but is pass level (acceptable), and considered as "C". When it is less than 10 mol %, it is determined that catalyst activity is poor (not pass), and considered as "D".

(2) Durability (Life Time)

The durability was evaluated under the following conditions:

First, the structured catalyst used in evaluation (1) above was recovered and heated at 65° C. for 12 hours to produce a structured catalyst after heating. Next, a decomposition reaction of butylbenzene (a model material of heavy oil) was performed by the similar method as in evaluation (1) above using the obtained structured catalyst after heating, and component analysis of the generated gas and the generated liquid was performed in the similar manner as in the above evaluation (1).

Based on the obtained analytical results, the yield (mol %) of a compound having a molecular weight lower than that of butylbenzene was determined in the similar manner as in evaluation (1) above. Furthermore, the degree of maintaining the yield of the above compound by the structured catalyst after heating was compared to the yield of the above compound by the structured catalyst before heating (the yield determined in evaluation (1) above). Specifically, the percentage (%) of the yield of the compound obtained by the structured catalyst after heating (yield determined by evaluation (2) above) to the yield of the above compound by the structured catalyst before heating (yield determined by the present evaluation (1) above) was calculated.

In the present embodiment, when the yield of the compound (yield determined by the present evaluation (2)) of the above compound due to the structured catalyst after heating (yield determined by the present evaluation (2)) is maintained at least 80% compared to the yield of the compound obtained by the structured catalyst before heating (yield determined by evaluation (1) above), it is determined that durability (heat resistance) is excellent, and considered as "A". When it is maintained 60% or more and less than 80%, it is determined that durability (heat resistance) is good, and considered as "B". When it is maintained 40% or more and less than 60%, it is determined that durability (heat resistance) is not good, but is pass level (acceptable), and. considered as "C". When it is reduced below 40%, it is determined that durability (heat resistance) is poor (not pass), and considered as "D".

Performance evaluations similar to those of evaluation (1) and (2) above were also performed on Comparative Examples 1 and 2. Note that Comparative Example 2 is the support itself, and contains no catalytic substance. Therefore, in the performance evaluation described above, only the support of Comparative Example 2 was charged in place of the structured catalyst. The results are shown in Table 8.

TABLE 1

| | Making Conditions of Structured Catalyst | | | | | | |
|---|---|---|---|---|---|---|---|
| | Precursor Material (A) | | | Addition to Precursor Material (A) | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | None | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |
| Example 34 | SBA-1 | 10.9 | | | | | |
| Example 35 | | 16.3 | | | | | |
| Example 36 | | 21.8 | | | | | |
| Example 37 | MCM-41 | 1.1 | None | 1000 | | | |
| Example 38 | | | | 500 | | | |
| Example 39 | | | | 200 | | | |
| Example 40 | | | | 100 | | | |
| Example 41 | | 1.6 | | | | | |
| Example 42 | | 2.0 | | | | | |
| Example 43 | | 2.2 | | | | | |
| Example 44 | | 2.7 | | | | | |
| Example 45 | | 5.4 | | | | | |
| Example 46 | SBA-1 | 10.9 | | | | | |
| Example 47 | | 16.3 | | | | | |
| Example 48 | | 21.8 | | | | | |

TABLE 1-continued

| | Structured Catalyst | | | | | | |
|---|---|---|---|---|---|---|---|
| | | Support Zeolite-Type Compound | | Catalytic Substance Metal Oxide Nanoparticles | | | |
| | | Average Inner Diameter of Channels | | Average Particle Size $D_C$ | | Performance Evaluation | |
| No. | Framework | $D_F$ (nm) | Type | (nm) | $D_C/D_F$ | Catalytic Activity | Durability |
| Example 1 | FAU | 0.74 | $CoO_x/ZrO_x$ | 0.13 | 0.2 | C | C |
| Example 2 | | | | 0.40 | 0.5 | C | C |
| Example 3 | | | | 0.66 | 0.9 | B | C |
| Example 4 | | | | 1.32 | 1.8 | A | B |
| Example 5 | | | | 1.98 | 2.7 | A | B |
| Example 6 | | | | 2.38 | 3.2 | A | A |
| Example 7 | | | | 2.64 | 3.6 | A | A |
| Example 8 | | | | 3.30 | 4.5 | A | A |
| Example 9 | | | | 6.61 | 8.9 | B | A |
| Example 10 | | | | 13.21 | 17.9 | B | A |
| Example 11 | | | | 19.82 | 26.8 | C | A |
| Example 12 | | | | 26.43 | 35.7 | C | A |
| Example 13 | | | | 0.13 | 0.2 | C | C |
| Example 14 | | | | 0.40 | 0.5 | C | C |
| Example 15 | | | | 0.66 | 0.9 | B | C |
| Example 16 | | | | 1.32 | 1.8 | A | B |
| Example 17 | | | | 1.98 | 2.7 | A | B |
| Example 18 | | | | 2.38 | 3.2 | B | A |
| Example 19 | | | | 2.64 | 3.6 | B | A |
| Example 20 | | | | 3.30 | 4.5 | B | A |
| Example 21 | | | | 6.61 | 8.9 | C | A |
| Example 22 | | | | 13.21 | 17.9 | C | A |
| Example 23 | | | | 19.82 | 26.8 | C | A |
| Example 24 | | | | 26.43 | 35.7 | C | A |
| Example 25 | MTW | 0.61 | | 0.11 | 0.2 | C | C |
| Example 26 | | | | 0.33 | 0.5 | C | C |
| Example 27 | | | | 0.54 | 0.9 | B | C |
| Example 28 | | | | 1.09 | 1.8 | A | B |
| Example 29 | | | | 1.63 | 2.7 | A | B |
| Example 30 | | | | 1.96 | 3.2 | A | B |
| Example 31 | | | | 2.18 | 3.6 | A | A |
| Example 32 | | | | 2.72 | 4.5 | A | A |
| Example 33 | | | | 5.45 | 8.9 | B | A |
| Example 34 | | | | 10.89 | 17.9 | B | A |
| Example 35 | | | | 16.34 | 26.8 | C | A |
| Example 36 | | | | 21.79 | 35.7 | C | A |
| Example 37 | | | | 0.11 | 0.2 | C | C |
| Example 38 | | | | 0.33 | 0.5 | C | C |
| Example 39 | | | | 0.54 | 0.9 | B | C |
| Example 40 | | | | 1.09 | 1.8 | A | B |
| Example 41 | | | | 1.63 | 2.7 | A | B |
| Example 42 | | | | 1.96 | 3.2 | A | B |
| Example 43 | | | | 2.18 | 3.6 | B | A |
| Example 44 | | | | 2.72 | 4.5 | B | A |
| Example 45 | | | | 5.45 | 8.9 | C | A |
| Example 46 | | | | 10.89 | 17.9 | C | A |
| Example 47 | | | | 16.34 | 26.8 | C | A |
| Example 48 | | | | 21.79 | 35.7 | C | A |

TABLE 2

| | Making Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 49 | MCM-41 | 1.0 | Yes | 1000 | TPABr | 12 | 72 |
| Example 50 | | 1.0 | | 500 | | | |
| Example 51 | | 1.0 | | 200 | | | |
| Example 52 | | 1.0 | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | None | 1000 | | | |
| Example 62 | | 1.0 | | 500 | | | |
| Example 63 | | 1.0 | | 200 | | | |
| Example 64 | | 1.0 | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | | 10.0 | | | | | |
| Example 71 | SBA-1 | 15.0 | | | | | |
| Example 72 | | 20.0 | | | | | |
| Example 73 | MCM-41 | 1.0 | Yes | 1000 | TMABr | 12 | 120 |
| Example 74 | | 1.0 | | 500 | | | |
| Example 75 | | 1.0 | | 200 | | | |
| Example 76 | | 1.0 | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | None | 1000 | | | |
| Example 86 | | 1.0 | | 500 | | | |
| Example 87 | | 1.0 | | 200 | | | |
| Example 88 | | 1.0 | | 100 | | | |
| Example 89 | | 1.5 | | | | | |
| Example 90 | | 1.8 | | | | | |
| Example 91 | | 2.0 | | | | | |
| Example 92 | | 2.5 | | | | | |
| Example 93 | | 5.1 | | | | | |
| Example 94 | SBA-1 | 10.2 | | | | | |
| Example 95 | | 15.3 | | | | | |
| Example 96 | | 20.4 | | | | | |

TABLE 2-continued

| | Structured Catalyst | | | | | | |
|---|---|---|---|---|---|---|---|
| | | Support Zeolite-Type Compound | Catalytic Substance Metal Oxide Nanoparticles | | | Performance Evaluation | |
| | | Average Inner Diameter of Channels | | Average Particle | | | |
| No. | Framework | $D_F$ (nm) | Type | Size $D_C$ (nm) | $D_C/D_F$ | Catalytic Activity | Durability |
| Example 49 | MFI | 0.56 | $CoO_x/ZrO_x$ | 0.10 | 0.2 | C | C |
| Example 50 | | 0.56 | | 0.30 | 0.5 | C | C |
| Example 51 | | 0.56 | | 0.50 | 0.9 | B | C |
| Example 52 | | 0.56 | | 1.00 | 1.8 | A | B |
| Example 53 | | 0.56 | | 1.50 | 2.7 | A | B |
| Example 54 | | 0.56 | | 1.80 | 3.2 | A | A |
| Example 55 | | 0.56 | | 2.00 | 3.6 | A | A |
| Example 56 | | 0.56 | | 2.50 | 4.5 | A | A |
| Example 57 | | 0.56 | | 5.00 | 8.9 | B | A |
| Example 58 | | 0.56 | | 10.00 | 17.9 | B | A |
| Example 59 | | 0.56 | | 15.00 | 26.8 | C | A |
| Example 60 | | 0.56 | | 20.00 | 35.7 | C | A |
| Example 61 | | 0.56 | | 0.10 | 0.2 | C | C |
| Example 62 | | 0.56 | | 0.30 | 0.5 | C | C |
| Example 63 | | 0.56 | | 0.50 | 0.9 | B | C |
| Example 64 | | 0.56 | | 1.00 | 1.8 | A | B |
| Example 65 | | 0.56 | | 1.50 | 2.7 | A | B |
| Example 66 | | 0.56 | | 1.80 | 3.2 | B | A |
| Example 67 | | 0.56 | | 2.00 | 3.6 | B | A |
| Example 68 | | 0.56 | | 2.50 | 4.5 | B | A |
| Example 69 | | 0.56 | | 5.00 | 8.9 | C | A |
| Example 70 | | 0.56 | | 10.00 | 17.9 | C | A |
| Example 71 | | 0.56 | | 15.00 | 26.8 | C | A |
| Example 72 | | 0.56 | | 20.00 | 35.7 | C | A |
| Example 73 | FER | 0.57 | | 0.10 | 0.2 | C | C |
| Example 74 | | 0.57 | | 0.31 | 0.5 | C | C |
| Example 75 | | 0.57 | | 0.51 | 0.9 | B | C |
| Example 76 | | 0.57 | | 1.02 | 1.8 | A | B |
| Example 77 | | 0.57 | | 1.53 | 2.7 | A | B |
| Example 78 | | 0.57 | | 1.83 | 3.2 | A | B |
| Example 79 | | 0.57 | | 2.04 | 3.6 | A | A |
| Example 80 | | 0.57 | | 2.54 | 4.5 | A | A |
| Example 81 | | 0.57 | | 5.09 | 8.9 | B | A |
| Example 82 | | 0.57 | | 10.18 | 17.9 | B | A |
| Example 83 | | 0.57 | | 15.27 | 26.8 | C | A |
| Example 84 | | 0.57 | | 20.36 | 35.7 | C | A |
| Example 85 | | 0.57 | | 0.10 | 0.2 | C | C |
| Example 86 | | 0.57 | | 0.31 | 0.5 | C | C |
| Example 87 | | 0.57 | | 0.51 | 0.9 | B | C |
| Example 88 | | 0.57 | | 1.02 | 1.8 | A | B |
| Example 89 | | 0.57 | | 1.53 | 2.7 | A | B |
| Example 90 | | 0.57 | | 1.83 | 3.2 | A | B |
| Example 91 | | 0.57 | | 2.04 | 3.6 | B | A |
| Example 92 | | 0.57 | | 2.54 | 4.5 | B | A |
| Example 93 | | 0.57 | | 5.09 | 8.9 | C | A |
| Example 94 | | 0.57 | | 10.18 | 17.9 | C | A |
| Example 95 | | 0.57 | | 15.27 | 26.8 | C | A |
| Example 96 | | 0.57 | | 20.36 | 35.7 | C | A |

TABLE 3

| | Making Conditions of Structured Catalyst | | | | | | |
|---|---|---|---|---|---|---|---|
| | Precursor Material (A) | | | Addition to Precursor Material (A) | | Hydrothermal Treatment Conditions using Precursor Material (C) | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 97 | MCM-41 | 1.3 | Yes | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA-1 | 13.2 | | | | | |
| Example 107 | | 19.8 | | | | | |
| Example 108 | | 26.4 | | | | | |
| Example 109 | MCM-41 | 1.3 | None | 1000 | | | |
| Example 110 | | | | 500 | | | |
| Example 111 | | | | 200 | | | |
| Example 112 | | | | 100 | | | |
| Example 113 | | 2.0 | | | | | |
| Example 114 | | 2.4 | | | | | |
| Example 115 | | 2.6 | | | | | |
| Example 116 | | 3.3 | | | | | |
| Example 117 | | 6.6 | | | | | |
| Example 118 | SBA-1 | 13.2 | | | | | |
| Example 119 | | 19.8 | | | | | |
| Example 120 | | 26.4 | | | | | |
| Example 121 | MCM-41 | 1.1 | Yes | 1000 | | 11 | 72 |
| Example 122 | | | | 500 | | | |
| Example 123 | | | | 200 | | | |
| Example 124 | | | | 100 | | | |
| Example 125 | | 1.6 | | | | | |
| Example 126 | | 2.0 | | | | | |
| Example 127 | | 2.2 | | | | | |
| Example 128 | | 2.7 | | | | | |
| Example 129 | | 5.4 | | | | | |
| Example 130 | SBA-1 | 10.9 | | | | | |
| Example 131 | | 16.3 | | | | | |
| Example 132 | | 21.8 | | | | | |
| Example 133 | MCM-41 | 1.1 | None | 1000 | | | |
| Example 134 | | | | 500 | | | |
| Example 135 | | | | 200 | | | |
| Example 136 | | | | 100 | | | |
| Example 137 | | 1.6 | | | | | |
| Example 138 | | 2.0 | | | | | |
| Example 139 | | 2.2 | | | | | |
| Example 140 | | 2.7 | | | | | |
| Example 141 | | 5.4 | | | | | |
| Example 142 | SBA-1 | 10.9 | | | | | |
| Example 143 | | 16.3 | | | | | |
| Example 144 | | 21.8 | | | | | |

TABLE 3-continued

| | Structured Catalyst | | | | | | |
|---|---|---|---|---|---|---|---|
| | | Support Zeolite-Type Compound | | Catalytic Substance Metal Oxide Nanoparticles | | Performance Evaluation | |
| | | Average Inner Diameter of Channels | | | Average Particle Size $D_C$ | Catalytic | |
| No. | Framework | $D_F$ (nm) | Type | | (nm) | $D_C/D_F$ Activity | Durability |
| Example 97 | FAU | 0.74 | $NiO_x/ZrO_x$ | | 0.13 | 0.2 C | C |
| Example 98 | | | | | 0.40 | 0.5 C | C |
| Example 99 | | | | | 0.66 | 0.9 B | C |
| Example 100 | | | | | 1.32 | 1.8 A | B |
| Example 101 | | | | | 1.98 | 2.7 A | B |
| Example 102 | | | | | 2.38 | 3.2 A | A |
| Example 103 | | | | | 2.64 | 3.6 A | A |
| Example 104 | | | | | 3.30 | 4.5 A | A |
| Example 105 | | | | | 6.61 | 8.9 B | A |
| Example 106 | | | | | 13.21 | 17.9 B | A |
| Example 107 | | | | | 19.82 | 26.8 C | A |
| Example 108 | | | | | 26.43 | 35.7 C | A |
| Example 109 | | | | | 0.13 | 0.2 C | C |
| Example 110 | | | | | 0.40 | 0.5 C | C |
| Example 111 | | | | | 0.66 | 0.9 B | C |
| Example 112 | | | | | 1.32 | 1.8 A | B |
| Example 113 | | | | | 1.98 | 2.7 A | B |
| Example 114 | | | | | 2.38 | 3.2 B | A |
| Example 115 | | | | | 2.64 | 3.6 B | A |
| Example 116 | | | | | 3.30 | 4.5 B | A |
| Example 117 | | | | | 6.61 | 8.9 C | A |
| Example 118 | | | | | 13.21 | 17.9 C | A |
| Example 119 | | | | | 19.82 | 26.8 C | A |
| Example 120 | | | | | 26.43 | 35.7 C | A |
| Example 121 | MTW | 0.61 | | | 0.11 | 0.2 C | C |
| Example 122 | | | | | 0.33 | 0.5 C | C |
| Example 123 | | | | | 0.54 | 0.9 B | C |
| Example 124 | | | | | 1.09 | 1.8 A | B |
| Example 125 | | | | | 1.63 | 2.7 A | B |
| Example 126 | | | | | 1.96 | 3.2 A | B |
| Example 127 | | | | | 2.18 | 3.6 A | A |
| Example 128 | | | | | 2.72 | 4.5 A | A |
| Example 129 | | | | | 5.45 | 8.9 B | A |
| Example 130 | | | | | 10.89 | 17.9 B | A |
| Example 131 | | | | | 16.34 | 26.8 C | A |
| Example 132 | | | | | 21.79 | 35.7 C | A |
| Example 133 | | | | | 0.11 | 0.2 C | C |
| Example 134 | | | | | 0.33 | 0.5 C | C |
| Example 135 | | | | | 0.54 | 0.9 B | C |
| Example 136 | | | | | 1.09 | 1.8 A | B |
| Example 137 | | | | | 1.63 | 2.7 A | B |
| Example 138 | | | | | 1.96 | 3.2 A | B |
| Example 139 | | | | | 2.18 | 3.6 B | A |
| Example 140 | | | | | 2.72 | 4.5 B | A |
| Example 141 | | | | | 5.45 | 8.9 C | A |
| Example 142 | | | | | 10.89 | 17.9 C | A |
| Example 143 | | | | | 16.34 | 26.8 C | A |
| Example 144 | | | | | 21.79 | 35.7 C | A |

TABLE 4

| | Making Conditions of Structured Catalyst | | | | | | | |
|---|---|---|---|---|---|---|---|---|
| | Precursor Material (A) | | | Addition to Precursor Material (A) | | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | | Type of Structural Directing Agent | pH | Time (h) |
| Example 145 | MCM-41 | 1.0 | Yes | 1000 | | TPABr | 12 | 72 |
| Example 146 | | 1.0 | | 500 | | | | |
| Example 147 | | 1.0 | | 200 | | | | |
| Example 148 | | 1.0 | | 100 | | | | |
| Example 149 | | 1.5 | | | | | | |
| Example 150 | | 1.8 | | | | | | |
| Example 151 | | 2.0 | | | | | | |
| Example 152 | | 2.5 | | | | | | |
| Example 153 | | 5.0 | | | | | | |
| Example 154 | SBA-1 | 10.0 | | | | | | |
| Example 155 | | 15.0 | | | | | | |
| Example 156 | | 20.0 | | | | | | |
| Example 157 | MCM-41 | 1.0 | None | 1000 | | | | |
| Example 158 | | 1.0 | | 500 | | | | |
| Example 159 | | 1.0 | | 200 | | | | |
| Example 160 | | 1.0 | | 100 | | | | |
| Example 161 | | 1.5 | | | | | | |
| Example 162 | | 1.8 | | | | | | |
| Example 163 | | 2.0 | | | | | | |
| Example 164 | | 2.5 | | | | | | |
| Example 165 | | 5.0 | | | | | | |
| Example 166 | SBA-1 | 10.0 | | | | | | |
| Example 167 | | 15.0 | | | | | | |
| Example 168 | | 20.0 | | | | | | |
| Example 169 | MCM-41 | 1.0 | Yes | 1000 | | TMABr | 12 | 120 |
| Example 170 | | 1.0 | | 500 | | | | |
| Example 171 | | 1.0 | | 200 | | | | |
| Example 172 | | 1.0 | | 100 | | | | |
| Example 173 | | 1.5 | | | | | | |
| Example 174 | | 1.8 | | | | | | |
| Example 175 | | 2.0 | | | | | | |
| Example 176 | | 2.5 | | | | | | |
| Example 177 | | 5.1 | | | | | | |
| Example 178 | SBA-1 | 10.2 | | | | | | |
| Example 179 | | 15.3 | | | | | | |
| Example 180 | | 20.4 | | | | | | |
| Example 181 | MCM-41 | 1.0 | None | 1000 | | | | |
| Example 182 | | 1.0 | | 500 | | | | |
| Example 183 | | 1.0 | | 200 | | | | |
| Example 184 | | 1.0 | | 100 | | | | |
| Example 185 | | 1.5 | | | | | | |
| Example 186 | | 1.8 | | | | | | |
| Example 187 | | 2.0 | | | | | | |
| Example 188 | | 2.5 | | | | | | |
| Example 189 | | 5.1 | | | | | | |
| Example 190 | SBA-1 | 10.2 | | | | | | |
| Example 191 | | 15.3 | | | | | | |
| Example 192 | | 20.4 | | | | | | |

TABLE 4-continued

| | Structured Catalyst | | | | | | |
|---|---|---|---|---|---|---|---|
| | Support Zeolite-Type Compound | | Catalytic Substance Metal Oxide Nanoparticles | | | Performance Evaluation | |
| | | Average Inner Diameter of Channels | | Average Particle | | | |
| No. | Framework | $D_F$ (nm) | Type | Size $D_C$ (nm) | $D_C/D_F$ | Catalytic Activity | Durability |
| Example 145 | MFI | 0.56 | $NiO_x/ZrO_x$ | 0.10 | 0.2 | C | C |
| Example 146 | | 0.56 | | 0.30 | 0.5 | C | C |
| Example 147 | | 0.56 | | 0.50 | 0.9 | B | C |
| Example 148 | | 0.56 | | 1.00 | 1.8 | A | B |
| Example 149 | | 0.56 | | 1.5 | 2.7 | A | B |
| Example 150 | | 0.56 | | 1.8 | 3.2 | A | A |
| Example 151 | | 0.56 | | 2.0 | 3.6 | A | A |
| Example 152 | | 0.56 | | 2.5 | 4.5 | A | A |
| Example 153 | | 0.56 | | 5.0 | 8.9 | B | A |
| Example 154 | | 0.56 | | 10.0 | 17.9 | B | A |
| Example 155 | | 0.56 | | 15.0 | 26.8 | C | A |
| Example 156 | | 0.56 | | 20.0 | 35.7 | C | A |
| Example 157 | | 0.56 | | 0.10 | 0.2 | C | C |
| Example 158 | | 0.56 | | 0.30 | 0.5 | C | C |
| Example 159 | | 0.56 | | 0.50 | 0.9 | B | C |
| Example 160 | | 0.56 | | 1.0 | 1.8 | A | B |
| Example 161 | | 0.56 | | 1.5 | 2.7 | A | B |
| Example 162 | | 0.56 | | 1.8 | 3.2 | B | A |
| Example 163 | | 0.56 | | 2.0 | 3.6 | B | A |
| Example 164 | | 0.56 | | 2.5 | 4.5 | B | A |
| Example 165 | | 0.56 | | 5.0 | 8.9 | C | A |
| Example 166 | | 0.56 | | 10.0 | 17.9 | C | A |
| Example 167 | | 0.56 | | 15.0 | 26.8 | C | A |
| Example 168 | | 0.56 | | 20.0 | 35.7 | C | A |
| Example 169 | FER | 0.57 | | 0.10 | 0.2 | C | C |
| Example 170 | | 0.57 | | 0.31 | 0.5 | C | C |
| Example 171 | | 0.57 | | 0.51 | 0.9 | B | C |
| Example 172 | | 0.57 | | 1.02 | 1.8 | A | B |
| Example 173 | | 0.57 | | 1.5 | 2.7 | A | B |
| Example 174 | | 0.57 | | 1.8 | 3.2 | A | B |
| Example 175 | | 0.57 | | 2.0 | 3.6 | A | A |
| Example 176 | | 0.57 | | 2.5 | 4.5 | A | A |
| Example 177 | | 0.57 | | 5.1 | 8.9 | B | A |
| Example 178 | | 0.57 | | 10.2 | 17.9 | B | A |
| Example 179 | | 0.57 | | 15.3 | 26.8 | C | A |
| Example 180 | | 0.57 | | 20.4 | 35.7 | C | A |
| Example 181 | | 0.57 | | 0.10 | 0.2 | C | C |
| Example 182 | | 0.57 | | 0.31 | 0.5 | C | C |
| Example 183 | | 0.57 | | 0.51 | 0.9 | B | C |
| Example 184 | | 0.57 | | 1.0 | 1.8 | A | B |
| Example 185 | | 0.57 | | 1.5 | 2.7 | A | B |
| Example 186 | | 0.57 | | 1.8 | 3.2 | A | B |
| Example 187 | | 0.57 | | 2.0 | 3.6 | B | A |
| Example 188 | | 0.57 | | 2.5 | 4.5 | B | A |
| Example 189 | | 0.57 | | 5.1 | 8.9 | C | A |
| Example 190 | | 0.57 | | 10.2 | 17.9 | C | A |
| Example 191 | | 0.57 | | 15.3 | 26.8 | C | A |
| Example 192 | | 0.57 | | 20.4 | 35.7 | C | A |

TABLE 5

| | Making Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| | | 19.8 | | | | | |
| | | 26.4 | | | | | |
| Example 203 | | | | | | | |
| Example 204 | | | | | | | |
| Example 205 | MCM-41 | 1.3 | None | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | None | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

TABLE 5-continued

| | Structured Catalyst | | | | | | |
|---|---|---|---|---|---|---|---|
| | Support Zeolite-Type Compound | | Catalytic Substance Metal Oxide Nanoparticles | | | Performance Evaluation | |
| | | Average Inner Diameter of Channels | | Average Particle Size $D_C$ | | Catalytic | |
| No. | Framework | $D_F$ (nm) | Type | (nm) | $D_C/D_F$ | Activity | Durability |
| Example 193 | FAU | 0.74 | $FeO_x/ZrO_x$ | 0.13 | 0.2 | C | C |
| Example 194 | | | | 0.40 | 0.5 | C | C |
| Example 195 | | | | 0.66 | 0.9 | B | C |
| Example 196 | | | | 1.32 | 1.8 | A | B |
| Example 197 | | | | 1.98 | 2.7 | A | B |
| Example 198 | | | | 2.38 | 3.2 | A | A |
| Example 199 | | | | 2.64 | 3.6 | A | A |
| Example 200 | | | | 3.30 | 4.5 | A | A |
| Example 201 | | | | 6.61 | 8.9 | B | A |
| Example 202 | | | | 13.21 | 17.9 | B | A |
| Example 203 | | | | 19.82 | 26.8 | C | A |
| Example 204 | | | | 26.43 | 35.7 | C | A |
| Example 205 | | | | 0.13 | 0.2 | C | C |
| Example 206 | | | | 0.40 | 0.5 | C | C |
| Example 207 | | | | 0.66 | 0.9 | B | C |
| Example 208 | | | | 1.32 | 1.8 | A | B |
| Example 209 | | | | 1.98 | 2.7 | A | B |
| Example 210 | | | | 2.38 | 3.2 | B | A |
| Example 211 | | | | 2.64 | 3.6 | B | A |
| Example 212 | | | | 3.30 | 4.5 | B | A |
| Example 213 | | | | 6.61 | 8.9 | C | A |
| Example 214 | | | | 13.21 | 17.9 | C | A |
| Example 215 | | | | 19.82 | 26.8 | C | A |
| Example 216 | | | | 26.43 | 35.7 | C | A |
| Example 217 | MTW | 0.61 | | 0.11 | 0.2 | C | C |
| Example 218 | | | | 0.33 | 0.5 | C | C |
| Example 219 | | | | 0.54 | 0.9 | B | C |
| Example 220 | | | | 1.09 | 1.8 | A | B |
| Example 221 | | | | 1.63 | 2.7 | A | B |
| Example 222 | | | | 1.96 | 3.2 | A | B |
| Example 223 | | | | 2.18 | 3.6 | A | A |
| Example 224 | | | | 2.72 | 4.5 | A | A |
| Example 225 | | | | 5.45 | 8.9 | B | A |
| Example 226 | | | | 10.89 | 17.9 | B | A |
| Example 227 | | | | 16.34 | 26.8 | C | A |
| Example 228 | | | | 21.79 | 35.7 | C | A |
| Example 229 | | | | 0.11 | 0.2 | C | C |
| Example 230 | | | | 0.33 | 0.5 | C | C |
| Example 231 | | | | 0.54 | 0.9 | B | C |
| Example 232 | | | | 1.09 | 1.8 | A | B |
| Example 233 | | | | 1.63 | 2.7 | A | B |
| Example 234 | | | | 1.96 | 3.2 | A | B |
| Example 235 | | | | 2.18 | 3.6 | B | A |
| Example 236 | | | | 2.72 | 4.5 | B | A |
| Example 237 | | | | 5.45 | 8.9 | C | A |
| Example 238 | | | | 10.89 | 17.9 | C | A |
| Example 239 | | | | 16.34 | 26.8 | C | A |
| Example 240 | | | | 21.79 | 35.7 | C | A |

TABLE 6

| | Making Conditions of Structured Catalyst | | | | | | |
|---|---|---|---|---|---|---|---|
| | Precursor Material (A) | | | Addition to Precursor Material (A) | | Hydrothermal Treatment Conditions using Precursor Material (C) | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
|---|---|---|---|---|---|---|---|
| Example 241 | MCM-41 | 1.0 | Yes | 1000 | TPABr | 12 | 72 |
| Example 242 | | 1.0 | | 500 | | | |
| Example 243 | | 1.0 | | 200 | | | |
| Example 244 | | 1.0 | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | None | 1000 | | | |
| Example 254 | | 1.0 | | 500 | | | |
| Example 255 | | 1.0 | | 200 | | | |
| Example 256 | | 1.0 | | 100 | | | |
| Example 257 | | 1.5 | | | | | |
| Example 258 | | 1.8 | | | | | |
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 12 | 120 |
| Example 266 | | 1.0 | | 500 | | | |
| Example 267 | | 1.0 | | 200 | | | |
| Example 268 | | 1.0 | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | None | 1000 | | | |
| Example 278 | | 1.0 | | 500 | | | |
| Example 279 | | 1.0 | | 200 | | | |
| Example 280 | | 1.0 | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |
| Example 287 | | 15.3 | | | | | |
| Example 288 | | 20.4 | | | | | |

TABLE 6-continued

| | Structured Catalyst | | | | | | |
|---|---|---|---|---|---|---|---|
| | Support Zeolite-Type Compound | | Catalytic Substance Metal Oxide Nanoparticles | | | Performance Evaluation | |
| | | Average Inner Diameter of Channels | | Average Particle | | | |
| No. | Framework | $D_F$ (nm) | Type | Size $D_C$ (nm) | $D_C/D_F$ | Catalytic Activity | Durability |
| Example 241 | MFI | 0.56 | $FeO_x/ZrO_x$ | 0.10 | 0.2 | C | C |
| Example 242 | | 0.56 | | 0.30 | 0.5 | C | C |
| Example 243 | | 0.56 | | 0.50 | 0.9 | B | C |
| Example 244 | | 0.56 | | 1.00 | 1.8 | A | B |
| Example 245 | | 0.56 | | 1.50 | 2.7 | A | B |
| Example 246 | | 0.56 | | 1.80 | 3.2 | A | A |
| Example 247 | | 0.56 | | 2.00 | 3.6 | A | A |
| Example 248 | | 0.56 | | 2.50 | 4.5 | A | A |
| Example 249 | | 0.56 | | 5.00 | 8.9 | B | A |
| Example 250 | | 0.56 | | 10.00 | 17.9 | B | A |
| Example 251 | | 0.56 | | 15.00 | 26.8 | C | A |
| Example 252 | | 0.56 | | 20.00 | 35.7 | C | A |
| Example 253 | | 0.56 | | 0.10 | 0.2 | C | C |
| Example 254 | | 0.56 | | 0.30 | 0.5 | C | C |
| Example 255 | | 0.56 | | 0.50 | 0.9 | B | C |
| Example 256 | | 0.56 | | 1.00 | 1.8 | A | B |
| Example 257 | | 0.56 | | 1.50 | 2.7 | A | B |
| Example 258 | | 0.56 | | 1.80 | 3.2 | B | A |
| Example 259 | | 0.56 | | 2.00 | 3.6 | B | A |
| Example 260 | | 0.56 | | 2.50 | 4.5 | B | A |
| Example 261 | | 0.56 | | 5.00 | 8.9 | C | A |
| Example 262 | | 0.56 | | 10.00 | 17.9 | C | A |
| Example 263 | | 0.56 | | 15.00 | 26.8 | C | A |
| Example 264 | | 0.56 | | 20.00 | 35.7 | C | A |
| Example 265 | FER | 0.57 | | 0.10 | 0.2 | C | C |
| Example 266 | | 0.57 | | 0.31 | 0.5 | C | C |
| Example 267 | | 0.57 | | 0.51 | 0.9 | B | C |
| Example 268 | | 0.57 | | 1.02 | 1.8 | A | B |
| Example 269 | | 0.57 | | 1.53 | 2.7 | A | B |
| Example 270 | | 0.57 | | 1.83 | 3.2 | A | B |
| Example 271 | | 0.57 | | 2.04 | 3.6 | A | A |
| Example 272 | | 0.57 | | 2.54 | 4.5 | A | A |
| Example 273 | | 0.57 | | 5.09 | 8.9 | B | A |
| Example 274 | | 0.57 | | 10.18 | 17.9 | B | A |
| Example 275 | | 0.57 | | 15.27 | 26.8 | C | A |
| Example 276 | | 0.57 | | 20.36 | 35.7 | C | A |
| Example 277 | | 0.57 | | 0.10 | 0.2 | C | C |
| Example 278 | | 0.57 | | 0.31 | 0.5 | C | C |
| Example 279 | | 0.57 | | 0.51 | 0.9 | B | C |
| Example 280 | | 0.57 | | 1.02 | 1.8 | A | B |
| Example 281 | | 0.57 | | 1.53 | 2.7 | A | B |
| Example 282 | | 0.57 | | 1.83 | 3.2 | A | B |
| Example 283 | | 0.57 | | 2.04 | 3.6 | B | A |
| Example 284 | | 0.57 | | 2.54 | 4.5 | B | A |
| Example 285 | | 0.57 | | 5.09 | 8.9 | C | A |
| Example 286 | | 0.57 | | 10.18 | 17.9 | C | A |
| Example 287 | | 0.57 | | 15.27 | 26.8 | C | A |
| Example 288 | | 0.57 | | 20.36 | 35.7 | C | A |

TABLE 7

| | Making Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 289 | MCM-41 | 1.3 | Yes | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | None | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | None | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |
| Example 335 | | 16.3 | | | | | |
| Example 336 | | 21.8 | | | | | |

TABLE 7-continued

| No. | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|
| Example 289 | FAU | 0.74 | $CuO_x/ZrO_x$ | 0.13 | 0.2 | C | C |
| Example 290 | | | | 0.40 | 0.5 | C | C |
| Example 291 | | | | 0.66 | 0.9 | B | C |
| Example 292 | | | | 1.32 | 1.8 | A | B |
| Example 293 | | | | 1.98 | 2.7 | A | B |
| Example 294 | | | | 2.38 | 3.2 | A | A |
| Example 295 | | | | 2.64 | 3.6 | A | A |
| Example 296 | | | | 3.30 | 4.5 | A | A |
| Example 297 | | | | 6.61 | 8.9 | B | A |
| Example 298 | | | | 13.21 | 17.9 | B | A |
| Example 299 | | | | 19.82 | 26.8 | C | A |
| Example 300 | | | | 26.43 | 35.7 | C | A |
| Example 301 | | | | 0.13 | 0.2 | C | C |
| Example 302 | | | | 0.40 | 0.5 | C | C |
| Example 303 | | | | 0.66 | 0.9 | B | C |
| Example 304 | | | | 1.32 | 1.8 | A | B |
| Example 305 | | | | 1.98 | 2.7 | A | B |
| Example 306 | | | | 2.38 | 3.2 | B | A |
| Example 307 | | | | 2.64 | 3.6 | B | A |
| Example 308 | | | | 3.30 | 4.5 | B | A |
| Example 309 | | | | 6.61 | 8.9 | C | A |
| Example 310 | | | | 13.21 | 17.9 | C | A |
| Example 311 | | | | 19.82 | 26.8 | C | A |
| Example 312 | | | | 26.43 | 35.7 | C | A |
| Example 313 | MTW | 0.61 | | 0.11 | 0.2 | C | C |
| Example 314 | | | | 0.33 | 0.5 | C | C |
| Example 315 | | | | 0.54 | 0.9 | B | C |
| Example 316 | | | | 1.09 | 1.8 | A | B |
| Example 317 | | | | 1.63 | 2.7 | A | B |
| Example 318 | | | | 1.96 | 3.2 | A | B |
| Example 319 | | | | 2.18 | 3.6 | A | A |
| Example 320 | | | | 2.72 | 4.5 | A | A |
| Example 321 | | | | 5.45 | 8.9 | B | A |
| Example 322 | | | | 10.89 | 17.9 | B | A |
| Example 323 | | | | 16.34 | 26.8 | C | A |
| Example 324 | | | | 21.79 | 35.7 | C | A |
| Example 325 | | | | 0.11 | 0.2 | C | C |
| Example 326 | | | | 0.33 | 0.5 | C | C |
| Example 327 | | | | 0.54 | 0.9 | B | C |
| Example 328 | | | | 1.09 | 1.8 | A | B |
| Example 329 | | | | 1.63 | 2.7 | A | B |
| Example 330 | | | | 1.96 | 3.2 | A | B |
| Example 331 | | | | 2.18 | 3.6 | B | A |
| Example 332 | | | | 2.72 | 4.5 | B | A |
| Example 333 | | | | 5.45 | 8.9 | C | A |
| Example 334 | | | | 10.89 | 17.9 | C | A |
| Example 335 | | | | 16.34 | 26.8 | C | A |
| Example 336 | | | | 21.79 | 35.7 | C | A |

TABLE 8

| | Making Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio (Ratio of Number of Atoms) of Added Amount of Metal-containing Solution Si/M | Type of Structural Directing Agent | pH | Time (h) |
| Example 337 | MCM-41 | 1.0 | Yes | 1000 | TPABr | 12 | 72 |
| Example 338 | | 1.0 | | 500 | | | |
| Example 339 | | 1.0 | | 200 | | | |
| Example 340 | | 1.0 | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | None | 1000 | | | |
| Example 350 | | 1.0 | | 500 | | | |
| Example 351 | | 1.0 | | 200 | | | |
| Example 352 | | 1.0 | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |
| Example 361 | MCM-41 | 1.0 | Yes | 1000 | TMABr | 12 | 120 |
| Example 362 | | 1.0 | | 500 | | | |
| Example 363 | | 1.0 | | 200 | | | |
| Example 364 | | 1.0 | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM-41 | 1.0 | None | 1000 | | | |
| Example 374 | | 1.0 | | 500 | | | |
| Example 375 | | 1.0 | | 200 | | | |
| Example 376 | | 1.0 | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.2 | | | | | |
| Example 383 | | 15.3 | | | | | |
| Example 384 | | 20.4 | | | | | |
| Comparative Example 1 | | | | — | | | |
| Comparative Example 2 | | | | — | | | |

TABLE 8-continued

| | Structured Catalyst | | | | | |
|---|---|---|---|---|---|---|
| | Support Zeolite-Type Compound | | Catalytic Substance Metal Oxide Nanoparticles | | Performance Evaluation | |
| | | Average Inner Diameter of Channels | | Average Particle | | |
| No. | Framework | $D_F$ (nm) | Type | Size $D_C$ (nm) | $D_C/D_F$ | Catalytic Activity | Durability |
|---|---|---|---|---|---|---|---|
| Example 337 | MFI | 0.56 | $CuO_x/ZrO_x$ | 0.10 | 0.2 | C | C |
| Example 338 | | 0.56 | | 0.30 | 0.5 | C | C |
| Example 339 | | 0.56 | | 0.50 | 0.9 | B | C |
| Example 340 | | 0.56 | | 1.00 | 1.8 | A | B |
| Example 341 | | 0.56 | | 1.50 | 2.7 | A | B |
| Example 342 | | 0.56 | | 1.80 | 3.2 | A | A |
| Example 343 | | 0.56 | | 2.00 | 3.6 | A | A |
| Example 344 | | 0.56 | | 2.50 | 4.5 | A | A |
| Example 345 | | 0.56 | | 5.00 | 8.9 | B | A |
| Example 346 | | 0.56 | | 10.00 | 17.9 | B | A |
| Example 347 | | 0.56 | | 15.00 | 26.8 | C | A |
| Example 348 | | 0.56 | | 20.00 | 35.7 | C | A |
| Example 349 | | 0.56 | | 0.10 | 0.2 | C | C |
| Example 350 | | 0.56 | | 0.30 | 0.5 | C | C |
| Example 351 | | 0.56 | | 0.50 | 0.9 | B | C |
| Example 352 | | 0.56 | | 1.00 | 1.8 | A | B |
| Example 353 | | 0.56 | | 1.50 | 2.7 | A | B |
| Example 354 | | 0.56 | | 1.80 | 3.2 | B | A |
| Example 355 | | 0.56 | | 2.00 | 3.6 | B | A |
| Example 356 | | 0.56 | | 2.50 | 4.5 | B | A |
| Example 357 | | 0.56 | | 5.00 | 8.9 | C | A |
| Example 358 | | 0.56 | | 10.00 | 17.9 | C | A |
| Example 359 | | 0.56 | | 15.00 | 26.8 | C | A |
| Example 360 | | 0.56 | | 20.00 | 35.7 | C | A |
| Example 361 | FER | 0.57 | | 0.10 | 0.2 | C | C |
| Example 362 | | 0.57 | | 0.31 | 0.5 | C | C |
| Example 363 | | 0.57 | | 0.51 | 0.9 | B | C |
| Example 364 | | 0.57 | | 1.02 | 1.8 | A | B |
| Example 365 | | 0.57 | | 1.53 | 2.7 | A | B |
| Example 366 | | 0.57 | | 1.83 | 3.2 | A | B |
| Example 367 | | 0.57 | | 2.04 | 3.6 | A | A |
| Example 368 | | 0.57 | | 2.54 | 4.5 | A | A |
| Example 369 | | 0.57 | | 5.09 | 8.9 | B | A |
| Example 370 | | 0.57 | | 10.18 | 17.9 | B | A |
| Example 371 | | 0.57 | | 15.27 | 26.8 | C | A |
| Example 372 | | 0.57 | | 20.36 | 35.7 | C | A |
| Example 373 | | 0.57 | | 0.10 | 0.2 | C | C |
| Example 374 | | 0.57 | | 0.31 | 0.5 | C | C |
| Example 375 | | 0.57 | | 0.51 | 0.9 | B | C |
| Example 376 | | 0.57 | | 1.02 | 1.8 | A | B |
| Example 377 | | 0.57 | | 1.53 | 2.7 | A | B |
| Example 378 | | 0.57 | | 1.83 | 3.2 | A | B |
| Example 379 | | 0.57 | | 2.04 | 3.6 | B | A |
| Example 380 | | 0.57 | | 2.54 | 4.5 | B | A |
| Example 381 | | 0.57 | | 5.09 | 8.9 | C | A |
| Example 382 | | 0.57 | | 10.18 | 17.9 | C | A |
| Example 383 | | 0.57 | | 15.27 | 26.8 | C | A |
| Example 384 | | 0.57 | | 20.36 | 35.7 | C | A |
| Comparative Example 1 | MFI type silicalite | 0.56 | $CoO_x$ | ≤50 | ≤67.6 | C | D |
| Comparative Example 2 | MFI type silicalite | 0.56 | | | | D | D |

As can be seen from Tables 1 to 8, the catalytic structural bodies (Examples 1 to 384), which was confirmed by cross sectional observation to hold the catalytic substance inside the support was found to exhibit excellent catalytic activity in the decomposition reaction of butylbenzene and excellent durability as a catalyst compared to the structured catalyst in which the catalytic substance was simply adhered to the outer surface of the support (Comparative Example 1) or the support having no catalytic substance (Comparative Example 2).

In addition, the relationship between the amount of the metal (mass %) embedded in the support of the structured catalyst measured in the evaluation [C], and the yield (mol %) of a compound having a molecular weight smaller than that of butylbenzene contained in the produced liquid was evaluated. The evaluation method was the same as the evaluation method performed in "(1) catalytic activity" in the [D] "performance evaluation" described above.

As a result, in each example, when the value obtained by converting the added amount of the metal-containing solution added to the precursor material (A) to the ratio of number of atoms Si/M (M=Fe) was from 50 to 200 (the content of the metal oxide nanoparticles relative to the structured catalyst was from 0.5 to 2.5 mass %), the yield of the compound having a molecular weight lower than that of butylbenzene contained in the produced liquid was 32 mol % or more, and the catalytic activity in the decomposition reaction of butylbenzene was found to be higher than or equal to the pass level. The reason for no further increase in catalytic activity when the amount of metal (mass %) embedded in the support was over 0.8 mass % (Si/M≤100) is likely due to that the decrease in the crystal strength of the support, and the decrease of active points because of the increase in the amount of coke deposition on the catalyst surface.

On the other hand, although the structured catalyst of Comparative Example 1 in which the catalytic substance was attached only to the outer surface of the support, the catalytic activity in the decomposition reaction of butylbenzene was improved compared to the support of Comparative Example 2, which had no catalytic substance, but exhibited inferior durability as a catalyst compared to the structured catalyst of Examples 1 to 384.

In addition, the support of Comparative Example 2, which had no catalytic substance, exhibited little catalytic activity in the decomposition reaction of butylbenzene, and both the catalytic activity and the durability were inferior compared to the structured catalyst of Examples 1 to 384.

According to the above results, it can be inferred that the catalytic structural bodies (Examples 1 to 384) exhibit excellent catalytic activity even in catalytic cracking activity or hydrodesulfurization activity, and have excellent durability as catalysts.

Furthermore, of Examples 1 to 384, a plurality of examples those achieved excellent results in the activity evaluation and heat resistance evaluation (see Table 9) were selected, and measured and evaluated for the amount of coking. A reaction tube was produced by filling the upper row of a catalyst tube (inner diameter: 10 mm) with a commercially available iron oxide (manufactured by Wako Pure Chemical Industries, Ltd.), and filling the bottom row with 0.25 g portions of the catalytic structural bodies of each examples. 10 mass % of heavy oil (diluted with toluene) and distilled water were passed through the reaction tube at 2.9 mL/min and 5 mL/min, respectively, and allowed to react at 470° C. for 2 h. Thereafter, the amount of coke deposition (mass %) of each of the catalytic structural bodies was measured and evaluated. The case where the amount of coke deposition was less than 2 mass % was evaluated as excellent "B", 2 mass % or more and less than 3 mass % was evaluated as "pass level "C", and 3 mass % or more was evaluated as "D".

Furthermore, the amount of coke deposition (mass %) was measured and evaluated in the same manner as described above, except that the upper row of the reaction tube was filled with a zeolite catalyst in which iron oxide nanoparticles were held in a support, and the bottom was filled with a structured catalyst in which FeOx nanoparticles were embedded. The results are shown in Table 9.

TABLE 9

| | Structured Catalyst | | | | | Performance Evaluation | | |
|---|---|---|---|---|---|---|---|---|
| | Support Zeolite-Type Compound | | Catalytic Substance Metal Oxide Nanoparticles | | | | | |
| No. | Structure | Average Inner Diameter of Channels $D_F$ (nm) | Type | Average Particle Size $D_C$ (nm) | $D_C/D_F$ | Catalytic Activity | Durability | Amount of Coke Deposition |
| Example 5 | FAU | 0.74 | $CoO_x/ZrO_x$ | 1.98 | 2.7 | A | B | B |
| Example 6 | | | | 2.38 | 3.2 | A | A | B |
| Example 7 | | | | 2.64 | 3.6 | A | A | B |
| Example 8 | | | | 3.30 | 4.5 | A | A | B |
| Example 31 | MTW | 0.61 | | 2.18 | 3.6 | A | A | B |
| Example 32 | | | | 2.72 | 4.5 | A | A | B |
| Example 54 | MFI | 0.56 | | 1.80 | 3.2 | A | A | B |
| Example 55 | | | | 2.00 | 3.6 | A | A | B |
| Example 56 | | | | 2.50 | 4.5 | A | A | B |
| Example 79 | FER | 0.57 | | 2.04 | 3.6 | A | A | B |
| Example 80 | | | | 2.54 | 4.5 | A | A | B |
| Example 102 | FAU | 0.74 | $NiO_x/ZrO_x$ | 2.38 | 3.2 | A | A | B |
| Example 103 | | | | 2.64 | 3.6 | A | A | B |
| Example 104 | | | | 3.30 | 4.5 | A | A | B |
| Example 127 | MTW | 0.61 | | 2.18 | 3.6 | A | A | B |
| Example 128 | | | | 2.72 | 4.5 | A | A | B |
| Example 150 | MFI | 0.56 | | 1.8 | 3.2 | A | A | B |

TABLE 9-continued

| | Structured Catalyst | | | | | | |
|---|---|---|---|---|---|---|---|
| | Support Zeolite-Type Compound | | Catalytic Substance Metal Oxide Nanoparticles | | | Performance Evaluation | |
| No. | Structure | Average Inner Diameter of Channels $D_F$ (nm) | Type | Average Particle Size $D_C$ (nm) | $D_C/D_F$ | Catalytic Activity | Durability | Amount of Coke Deposition |
| Example 151 | | 0.56 | | 2.0 | 3.6 | A | A | B |
| Example 152 | | 0.56 | | 2.5 | 4.5 | A | A | B |
| Example 175 | FER | 0.57 | | 2.0 | 3.6 | A | A | B |
| Example 176 | | 0.57 | | 2.5 | 4.5 | A | A | B |
| Example 198 | FAU | 0.74 | $FeO_x/ZrO_x$ | 2.38 | 3.2 | A | A | B |
| Example 199 | | | | 2.64 | 3.6 | A | A | B |
| Example 200 | | | | 3.30 | 4.5 | A | A | B |
| Example 223 | MTW | 0.61 | | 2.18 | 3.6 | A | A | B |
| Example 224 | | | | 2.72 | 4.5 | A | A | B |
| Example 246 | MFI | 0.56 | | 1.80 | 3.2 | A | A | B |
| Example 247 | | 0.56 | | 2.00 | 3.6 | A | A | B |
| Example 248 | | 0.56 | | 2.50 | 4.5 | A | A | B |
| Example 271 | FER | 0.57 | | 2.04 | 3.6 | A | A | B |
| Example 272 | | 0.57 | | 2.54 | 4.5 | A | A | B |
| Example 294 | FAU | 0.74 | $CuO_x/ZrO_x$ | 2.38 | 3.2 | A | A | B |
| Example 295 | | | | 2.64 | 3.6 | A | A | B |
| Example 296 | | | | 3.30 | 4.5 | A | A | B |
| Example 319 | MTW | 0.61 | | 2.18 | 3.6 | A | A | B |
| Example 320 | | | | 2.72 | 4.5 | A | A | B |
| Example 342 | MFI | 0.56 | | 1.80 | 3.2 | A | A | B |
| Example 343 | | 0.56 | | 2.00 | 3.6 | A | A | B |
| Example 344 | | 0.56 | | 2.50 | 4.5 | A | A | B |
| Example 367 | FER | 0.57 | | 2.04 | 3.6 | A | A | B |
| Example 368 | | 0.57 | | 2.54 | 4.5 | A | A | B |
| Comparative Example 3 | FAU | 0.74 | $FeO_x$ | 2.4 | 3.2 | A | A | C |
| Comparative Example 4 | MTW | 0.61 | | 2.2 | 3.6 | A | A | C |
| Comparative Example 5 | MFI | 0.56 | | 2.0 | 3.6 | A | A | C |
| Comparative Example 6 | FER | 0.57 | | 2.0 | 3.6 | A | A | C |
| Comparative Example 7 | — | — | $Fe_2O_3$ | — | — | — | — | D |

From the results shown in Table 9, it was found that the structured catalyst including the complex oxide nanoparticles held in its support had a smaller amount of coke deposition and superior catalyst performance in comparison with the catalytic structural bodies including FeOx nanoparticles held in their supports (Comparative Examples 3 to 6) and the zeolite catalyst including iron oxide held in its support (Comparative Example 7). The reason for this is likely that hydrogen was generated from water by the water molecule dissociation ability of ZrOx contained in the complex oxide nanoparticles, and the decomposed heavy oil in a radical state was stabilized by hydrogen.

Other Embodiments (1) A method for using a structured catalyst for catalytic cracking or hydrodesulfurization of a crude oil, a heavy oil, or a fraction thereof, the structured catalyst including a support of porous structure composed of a zeolite-type compound and at least one type of metal oxide nanoparticles present in the support, the support having channels that communicate with each other, the metal oxide nanoparticles being present in at least in the channels of the support, and the metal oxide nanoparticles being composed of a material containing any one or two or more of the oxides of Fe, Al, Zn, Zr, Cu, Co, Ni, Ce, Nb, Ti, Mo, V, Cr, Pd, and Ru.

(2) The method for using a structured catalyst according to (1), including:
providing a distilled fraction of crude oil to the structured catalyst; and
providing moisture to the structured catalyst.

(3) The method for using a structured catalyst according to (1) or (2), including using the structured catalyst in a catalytic cracking apparatus or a hydrodesulfurization apparatus, and subjecting the distilled fraction of crude oil to cracking or desulfurization treatment with the catalytic cracking apparatus or the hydrodesulfurization apparatus.

REFERENCE SIGNS LIST

1 Structured catalyst
10 Support
10a Outer surface
11 Channel
11a Pore
12 Enlarged pore portion
20 Metal oxide nanoparticles
30 Metal oxide nanoparticles
$D_C$ Average particle size
$D_F$ Average inner diameter
$D_E$ Inner diameter

What is claimed is:

1. A structured catalyst for catalytic cracking or hydrodesulfurization comprising:
   a support of a porous structure comprising a zeolite compound having a framework; and
   at least one type of metal oxide nanoparticles present in the support, wherein
   the support has a plurality of channels connecting with each other,
   the metal oxide nanoparticles are present at least in the channels of the support, and
   the metal oxide nanoparticles are composed of a material containing any one or two or more of the oxides of Fe, Al, Zn, Zr, Cu, Co, Ni, Ce, Nb, Ti, Mo, V, Cr, Pd, and Ru,
   wherein the channels have any one of a one-dimensional pore, a two-dimensional pore, and a three-dimensional pore defined by the framework of the zeolite compound and an enlarged pore portion that has an inner diameter greater than that of any of the one-dimensional pore, the two-dimensional pore, and the three-dimensional pore, is not defined by the framework of the zeolite-type compound, and is greater than or equal to an average particle size of the metal oxide nanoparticles,
   wherein the metal oxide nanoparticles are present at least in the enlarged pore portion to prevent contact between the metal oxide nanoparticles in the enlarged pore portions, and the average particle size of the metal oxide nanoparticles is greater than any one of the one-dimensional pore, the two-dimensional pore, and the three-dimensional pore defined by the framework of the zeolite-type compound, and
   wherein a skeletal structure of the zeolite compound is selected from a FAU type, a MTW type, a MFI type, a FER type, a LTA type, a MWW type, a MOR type, a LTL type, and a BEA type.

2. The structured catalyst for catalytic cracking or hydrodesulfurization according to claim 1, wherein
   the metal oxide nanoparticles are complex metal oxide nanoparticles composed of a material including two or more of metal oxides, and
   the complex metal oxide nanoparticles have a first metal oxide including any one or two or more of the oxides of Fe, Al, Zn, Cu, Co, Ni, Nb, Mo, V, Cr and Pd, and a second metal oxide including any one or two or more of the oxides of Zr, Ce, Ti, and Ru.

3. The structured catalyst for catalytic cracking or hydrodesulfurization according to claim 1, wherein the enlarged pore portion connects a plurality of pores constituting any one of the one-dimensional pore, the two-dimensional pore, and the three-dimensional pore to another plurality of pores constituting another one of the one-dimensional pore, the two-dimensional pore, and the three-dimensional pore.

4. The structured catalyst for catalytic cracking or hydrodesulfurization according to claim 1, wherein the average particle size of the metal oxide nanoparticles is less than or equal to the inner diameter of the enlarged pore portion.

5. The structured catalyst for catalytic cracking or hydrodesulfurization according to claim 1, wherein a metal element of the metal oxide nanoparticles is contained in an amount from 0.5 mass % to 2.5 mass % based on the structured catalyst.

6. The structured catalyst for catalytic cracking or hydrodesulfurization according to claim 1, wherein the average particle size of the metal oxide nanoparticles is from 0.1 nm to 50 nm.

7. The structured catalyst for catalytic cracking or hydrodesulfurization according to claim 1, wherein a ratio of the average particle size of the metal oxide nanoparticles to an average inner diameter of the channels is from 1.1 to b 36.

8. The structured catalyst for catalytic cracking or hydrodesulfurization according to claim 7, wherein the ratio of the average particle size of the metal oxide nanoparticles to the average inner diameter of the channels is from 1.7 to 4.5.

9. The structured catalyst for catalytic cracking or hydrodesulfurization according to claim 1, wherein the average inner diameter of the channels is from 0.1 nm to 1.5 nm, and the inner diameter of the enlarged pore portion is from 0.5 nm to 50 nm.

10. The structured catalyst for catalytic cracking or hydrodesulfurization according to claim 1, further comprising at least one other type of the metal oxide nanoparticles held on an outer surface of the support.

11. The structured catalyst for catalytic cracking or hydrodesulfurization according to claim 10, wherein a content of the at least one type of metal oxide nanoparticles present in the support is greater than a content of the at least one other type of metal oxide nanoparticles held on the outer surface of the support.

12. The structured catalyst for catalytic cracking or hydrodesulfurization according to claim 1, wherein the structured catalyst has a cylindrical, foliate, dumbbell column, or ring-shaped pellet shape, and an average particle size of the structured catalyst is from 100 μm to 15 cm.

13. The structured catalyst for catalytic cracking or hydrodesulfurization according to claim 1, wherein the enlarged pore portion connects a plurality of pores constituting any one of the one-dimensional pore, the two-dimensional pore, and the three-dimensional pore to another plurality of pores constituting one of the one-dimensional pore, the two-dimensional pore, and the three-dimensional pore.

* * * * *